United States Patent
Haynes

(10) Patent No.: US 11,634,162 B2
(45) Date of Patent: Apr. 25, 2023

(54) FULL UNCERTAINTY FOR MOTION PLANNING IN AUTONOMOUS VEHICLES

(71) Applicant: UATC, LLC, San Francisco, CA (US)

(72) Inventor: Galen Clark Haynes, Pittsburgh, PA (US)

(73) Assignee: UATC, LLC., Mountain View, CA (US)

( * ) Notice: Subject to any disclaimer, the term of this patent is extended or adjusted under 35 U.S.C. 154(b) by 341 days.

(21) Appl. No.: 16/825,539

(22) Filed: Mar. 20, 2020

(65) Prior Publication Data
US 2021/0046954 A1 Feb. 18, 2021

Related U.S. Application Data

(60) Provisional application No. 62/887,760, filed on Aug. 16, 2019.

(51) Int. Cl.
*B60W 60/00* (2020.01)
*G06N 20/00* (2019.01)

(52) U.S. Cl.
CPC .. *B60W 60/00276* (2020.02); *B60W 60/0011* (2020.02); *B60W 60/00272* (2020.02); *G06N 20/00* (2019.01)

(58) Field of Classification Search
CPC ....... B60W 60/0027; B60W 60/00272; B60W 60/00274; B60W 60/00276; B60W 2554/00; B60W 2554/40; B60W 2554/402; B60W 2554/4023; B60W 2554/4029; B60W 2554/404; B60W 2554/4042; B60W 2554/4043; B60W 2554/4044;

(Continued)

(56) References Cited

U.S. PATENT DOCUMENTS 10,216,189 B1   2/2019  Haynes
2013/0197736 A1  8/2013  Zhu et al.
(Continued)

OTHER PUBLICATIONS

Sal Khan, "Confidence intervals and margin of error" Dec. 14, 2017, Youtube.com, (Year: 2017).*

(Continued)

*Primary Examiner* — Adam R Mott
*Assistant Examiner* — Erick T. Detweiler
(74) *Attorney, Agent, or Firm* — Dority & Manning, P.A.

(57) ABSTRACT

Systems and methods for motion planning by a vehicle computing system of an autonomous vehicle are provided. The vehicle computing system can input sensor data to a machine-learned system including one or more machine-learned models. The computing system can obtain, as an output of the machine-learned model(s), motion prediction(s) associated with object(s) detected by the system. The system can convert a shape of the object(s) into a probability of occupancy by convolving an occupied area of the object(s) with a continuous uncertainty associated with the object(s). The system can determine a probability of future occupancy of a plurality of locations in the environment at future times based at least in part on the motion prediction(s) and the probability of occupancy of the object(s). The system can provide the motion prediction(s) and the probability of future occupancy of the plurality of locations to a motion planning system of the autonomous vehicle.

17 Claims, 16 Drawing Sheets

(58) Field of Classification Search
CPC ..... B60W 2554/801; B60W 2554/803; B60W 2554/804; B60W 2554/806; B60W 2556/00; B60W 2754/00; B60W 2754/10; B60W 2754/20; B60W 2754/30; B60W 2754/50; B60W 2754/70; B60W 30/08; G08G 1/00; G08G 1/16; G08G 1/164; G08G 1/165

See application file for complete search history.

(56) References Cited

U.S. PATENT DOCUMENTS

| | | | |
|---|---|---|---|
| 2018/0089563 A1 | 3/2018 | Redding et al. | |
| 2018/0107215 A1 | 4/2018 | Djuric et al. | |
| 2018/0345958 A1* | 12/2018 | Lo | G08G 1/166 |
| 2018/0373253 A1* | 12/2018 | Lipson | G05D 1/0214 |
| 2020/0004259 A1 | 1/2020 | Gulino et al. | |
| 2020/0339116 A1* | 10/2020 | Xu | B60W 30/18159 |
| 2021/0031760 A1* | 2/2021 | Ostafew | B60W 60/00274 |

OTHER PUBLICATIONS

International Search Report and Written Opinion for Application No. PCT/US2020/046589, dated Dec. 10, 2020, 12 pages.

Kim et al., "Probabilistic Vehicle Trajectory Prediction over Occupancy Grid Map via Recurrent Neural Network", arXiv:1704.07049v1, 6 pages.

Galvez del Postigo Fernandez et al., "Grid-Based Multi-Sensor Fusion for On-Road Obstacle Detection: Application to Autonomous Driving", Jan. 1, 2015, https://www.diva-portal.org/smash/get/diva2:852457/FULLTEXT01.pdf, retrieved on Feb. 10, 2021, 158 pages.

* cited by examiner

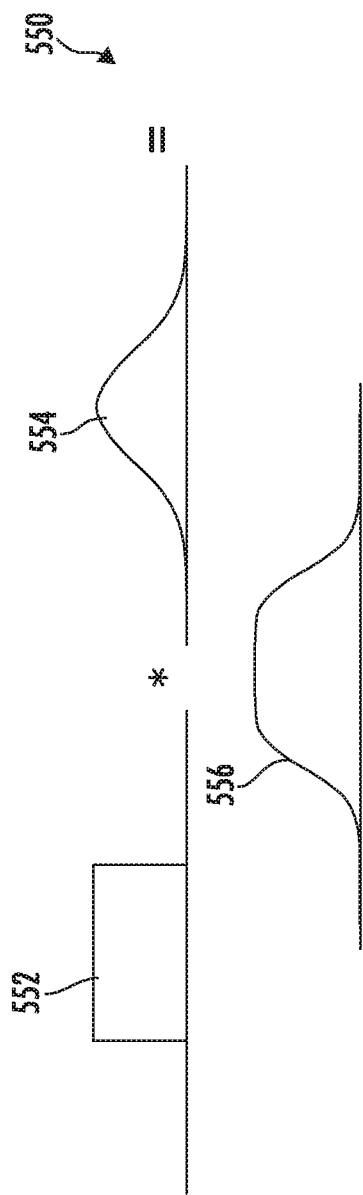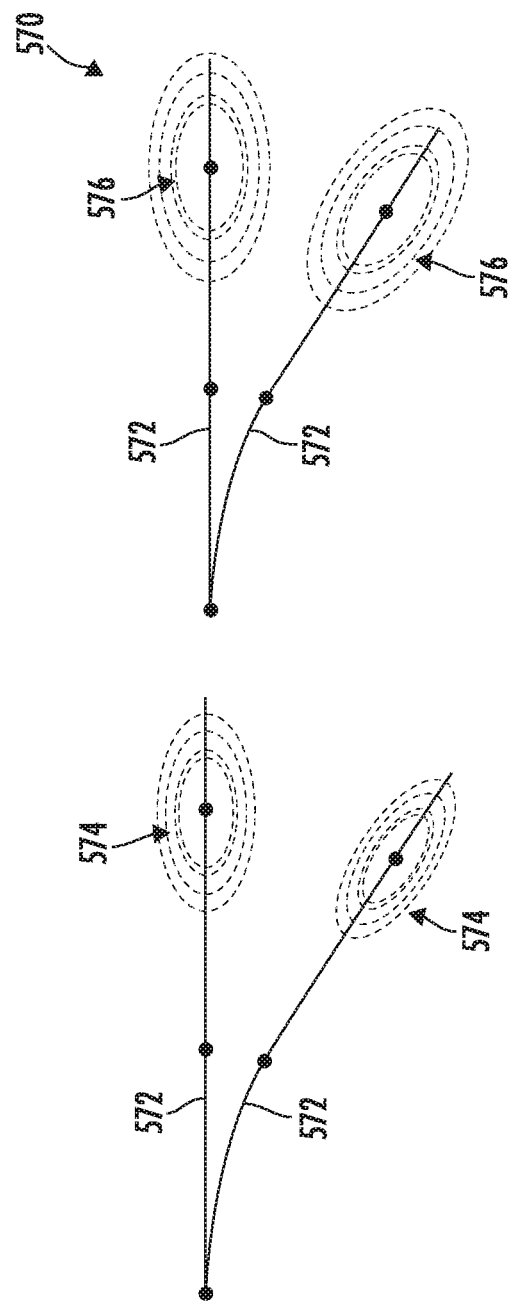

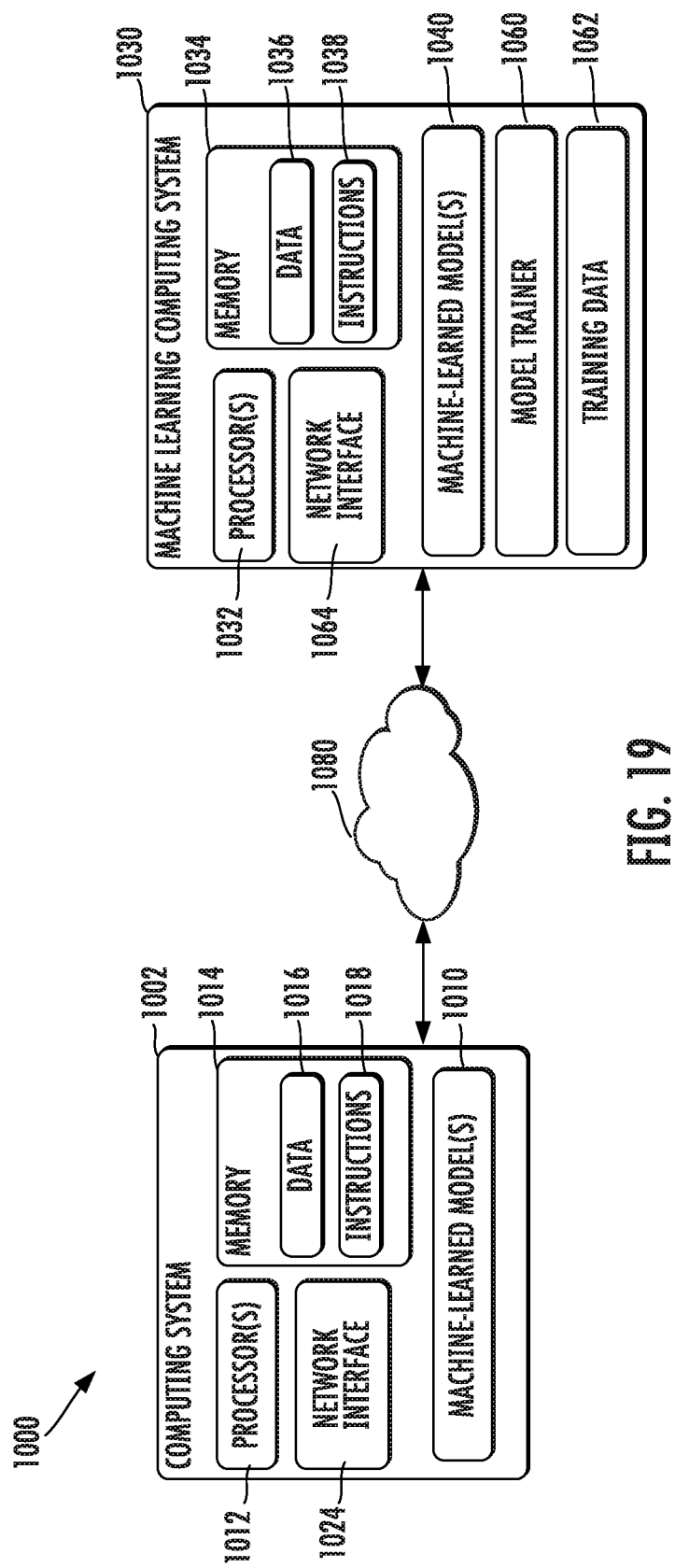

FULL UNCERTAINTY FOR MOTION PLANNING IN AUTONOMOUS VEHICLES

RELATED APPLICATION

This application claims priority to and the benefit of U.S. Provisional Patent Application No. 62/887,760 titled "Full Uncertainty for Motion Planning in Autonomous Vehicles," filed on Aug. 16, 2019. U.S. Provisional Patent Application No. 62/887,760 is hereby incorporated by reference herein in its entirety.

FIELD

The present disclosure relates generally to improving the ability of an autonomous vehicle to identify motion paths for navigating itself within an environment.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of motion planning for autonomous driving, wherein the method includes inputting, by a computing system comprising one or more computing devices, sensor data to a machine-learned system comprising one or more machine-learned models configured for object prediction in association with an environment external to an autonomous vehicle, obtaining, by the computing system as an output of the one or more machine-learned models, data indicative of one or more motion predictions associated with one or more objects detected by the machine-learned system, converting, by the computing system, a shape of the one or more objects detected by the machine-learned system into a probability of occupancy by convolving an occupied area of the one or more objects with a continuous uncertainty associated with the one or more objects, determining, by the computing system, data indicative of a probability of future occupancy of a plurality of locations in the environment at one or more future times based at least in part on the data indicative of the one or more motion predictions associated with the one or more objects and the probability of occupancy of the one or more objects, and providing, by the computing system, the data indicative of the one or more motion predictions associated with the one or more objects and the data indicative of the probability of future occupancy of the plurality of locations to a motion planning system of the autonomous vehicle.

Another example aspect of the present disclosure is directed to a computing system. The computing system includes one or more processors, and one or more tangible, non-transitory, computer readable media that collectively store instructions that when executed by the one or more processors cause the computing system to perform operations. The operations include inputting sensor data to a machine-learned system comprising one or more machine-learned models configured for object prediction in association with an environment external to an autonomous vehicle, obtaining, as an output of the one or more machine-learned models, data indicative of one or more motion predictions associated with one or more objects detected by the machine-learned system, converting a shape of the one or more objects detected by the machine-learned system into a probability of occupancy by convolving an occupied area of the one or more objects with a continuous uncertainty associated with the one or more objects, determining data indicative of a probability of future occupancy of a plurality of locations in the environment at one or more future times based at least in part on the data indicative of the one or more motion predictions associated with the one or more objects and the probability of occupancy of the one or more objects, and providing the data indicative of the one or more motion predictions and the data indicative of the probability of future occupancy of the plurality of locations to a motion planning system of the autonomous vehicle.

Yet another example aspect of the present disclosure is directed to an autonomous vehicle, including one or more sensors configured to generate sensor data in association with an environment external to the autonomous vehicle, one or more processors, and one or more non-transitory computer-readable media that collectively store instructions that, when executed by the one or more processors, cause the one or more processors to perform operations. The operations include inputting sensor data from the one or more sensors to a machine-learned system comprising one or more machine-learned models configured for object prediction, obtaining, as an output of the one or more machine-learned models, data indicative of one or more motion predictions associated with one or more objects detected by the machine-learned system, converting a shape of the one or more objects detected by the machine-learned system into a probability of occupancy by convolving an occupied area of the one or more objects with a continuous uncertainty associated with the one or more objects, determining data indicative of a probability of future occupancy of a plurality of locations in the environment at one or more future times based at least in part on the data indicative of the one or more motion predictions associated with the one or more objects and the probability of occupancy of the one or more objects, and providing the data indicative of the one or more motion predictions and the data indicative of the probability of future occupancy of the plurality of locations to a motion planning system of the autonomous vehicle.

Other example aspects of the present disclosure are directed to systems, methods, vehicles, apparatuses, tangible, non-transitory computer-readable media, and memory devices for motion planning for autonomous driving.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 8 depicts a graphical diagram illustrating a process of measuring probabilistic occupancy according to example embodiments of the present disclosure;

FIG. 9 depicts a graphical diagram illustrating a process of measuring probabilistic occupancy to describe trajectories with a continuous uncertainty

FIG. 19 depicts a block diagram of an example computing system according to example embodiments of the present disclosure.

DETAILED DESCRIPTION

Figure 1:
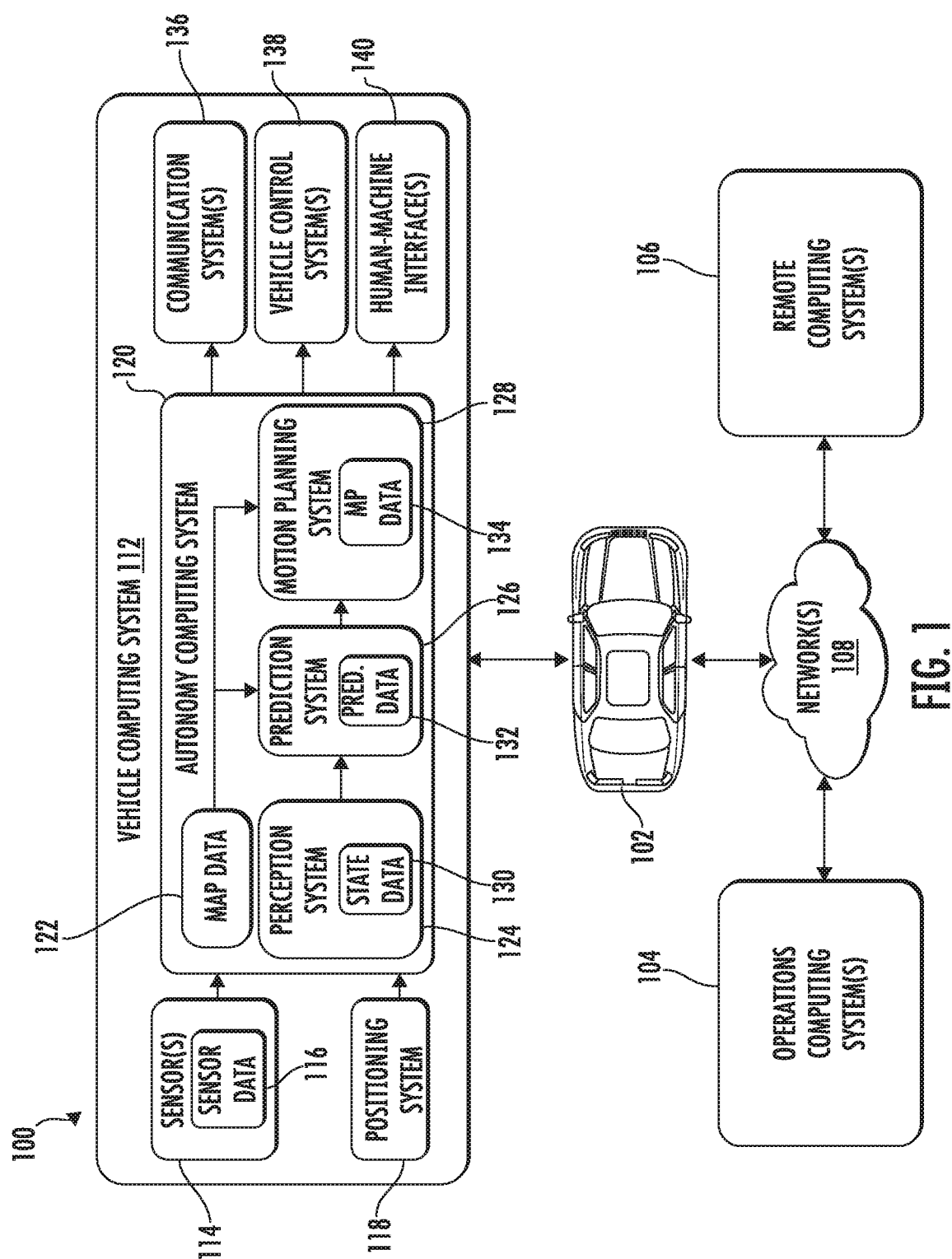
FIG. 1 depicts a block diagram of an example autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods that generate full uncertainty data in association with a probability of future occupancy for locations in a geographic area associated with an autonomous vehicle to improve motion planning for the autonomous vehicle. In some implementations, for example, an uncertainty system may receive data indicative of one or more motion predictions associated with one or more objects detected by the autonomous vehicle. The motion predictions can be generated by a prediction system of the autonomous vehicle, based at least in part on object detections generated by a perception system of the autonomous vehicle. The uncertainty system may optionally receive data indicative of the object detections generated by the perception system. The uncertainty system can convert a shape of an object into a probability of occupancy by convolving an occupied area of the object with a continuous uncertainty associated with the object. Additionally or alternatively, the uncertainty system can convolve the continuous uncertainty associated with the object with the shape of the object to generate a probabilistic uncertainty for at least one trajectory of the object. The uncertainty system can determine data indicative of a probability of future occupancy of locations in an environment at one or more future times based at least in part on the one or more motion predictions and/or the object detections. The data indicative of the probability of future occupancy can be provided to a motion planning system in addition to objection detection data and/or prediction data. The motion planning system can utilize the probability of future occupancy data to improve motion planning processes for the autonomous vehicle. Such an approach can provide full uncertainty with respect to locations by providing continuous estimates of an accurate probability of whether a particular location will be occupied by an object at a particular point in the future. In this manner, the motion planning system can fully reason over the uncertainty associated with a scene to deliver safety improvements to an overall autonomous driving system.

By way of example, consider a vehicle that is located in a parking spot proximate to the right of way of an autonomous vehicle. The vehicle may suddenly exit the parking spot and impede the autonomous vehicle's right of way. It may be difficult to predict a precise time that the vehicle may begin moving and pull into the right of way of the autonomous vehicle. In accordance with embodiments of the disclosed technology, an uncertainty system can continuously estimate an accurate probability of whether the vehicle will pull-out of the parking spot. In addition to the uncertainty represented by the probability of the vehicle moving, the uncertainty system can generate a probability of future occupancy for one or more locations in the environment around the vehicle. In this manner, the various uncertainties associated with the vehicle motion can be combined to form an overall probability of future occupancy of various locations by the vehicle. The probability of future occupancy based on the possible movement of the vehicle can be provided to the motion planning system. The motion planning system can then reason over the output space incorporating the probability of occupancy of locations by the parked car in the future. The motion planning system can reason over the full probability of the vehicle moving from the parking spot as represented in the probability of future occupancy of locations. Such an approach can represent an improvement over policy-based approaches that may simply reduce the driving speed when the autonomous vehicle is uncertain of the future motion of a parked vehicle. By contrast, the full uncertainty can be provided to the motion planning system to enable a motion plan to be generated comprehensively based on full reasoning over the probabilities associated with the motion of the parked vehicle.

The probability of future occupancy can be a per-object probability or a per-scene probability of future occupancy in example embodiments. For instance, the probability of future occupancy may indicate for a particular location, a probability of occupancy associated with a particular object at the particular location at a particular time. In other examples, the probability of future occupancy can be a per-scene or other probability that is indicative of a combined probability of occupancy associated with multiple objects. For instance, the probability of future occupancy may indicate for a particular location, a total probability of occupancy associated with multiple objects at the particular location at a particular time. Such an approach may include determining a combined probability of a plurality of objects occupying a particular location at a particular time. In this manner, the probability of occupancy can represent multiple discrete and/or continuous probabilities within an output space corresponding to a scene. For instance, the probability of occupancy for a location can incorporate discrete probabilities relating to detection (e.g., whether one or more objects are present), discrete probabilities relating to prediction (e.g., whether or not an object trajectory occurs), continuous probabilities relating to detection (e.g., a probability distribution representing multiple possible object classifications), and/or continuous probabilities relating to prediction (e.g., a probability distribution representing multiple object trajectories).

An uncertainty system in accordance with example embodiments of the disclosed technology may generate a probability of future occupancy based on perception data and/or prediction data. The perception data and the prediction data can be associated with one or multiple objects in a geographic area. A perception system of a vehicle computing system may include one or more first machine-learned models associated with detecting objects external to an autonomous vehicle. By way of example, the one or more first machine-learned models may include object detection models included as part of a segmentation or detection component of the perception system, object tracking models included as part of a tracking component of the perception system, and/or classification models included as part of a classification component of the perception system. Perception data may be generated by a perception system and may include object detection data, object state data (e.g., data relating to an object's position, velocity, acceleration, heading, or other information relative to an object's current state), object classification data, object tracking data, etc. A prediction system of a vehicle computing system may include one or more machine-learned models associated with predicting a future state of an object. By way of example, a prediction system may determine a predicted trajectory of an object, a predicted position of an object, a predicted velocity of an object, a predicted acceleration of an object, a predicted heading of an object, or other information pertaining to a predicted state of an object. The uncertainty system may utilize perception data and/or prediction data to generate data indicative of a probability of future occupancy for locations.

In some examples, the uncertainty system may generate a probability of future occupancy of a location based on a perception data and/or prediction data associated with a single object. For instance, the uncertainty system can obtain data indicative of an uncertainty for an object detection and an uncertainty for an object prediction associated with a first object. The uncertainty system can generate data indicative of the probability of future occupancy of a first location at a first time based at least in part on the data indicative of the uncertainty associated with the object detection and the data indicative of the uncertainty associated with the object prediction.

In other examples, the uncertainty system may generate a probability of future occupancy of a location based on perception data and/or prediction data associated with multiple objects. In example embodiments, continuous estimates and uncertainties such as uncertainties in the motion prediction of other vehicles or pedestrians, can be combined. These multiple continuous uncertainties can be propagated to generate an overall probability of future occupancy of locations at future times. Data indicative of this overall probability of future occupancy can be provided to the motion planning system. By way of example, the uncertainty system can determine data indicative of at least one uncertainty associated with one or more motion predictions associated with a first object. Similarly, the uncertainty system can determine data indicative of at least one uncertainty associated with one or more motion predictions associated with a second object. The uncertainty system can generate data indicative of a probability of future occupancy of a first location at a first time based at least in part on the data indicative of the at least one uncertainty associated with the one or more motion predictions associated with the first object and the data indicative of the at least one uncertainty associated with the one or more motion predictions associated with the second object.

According to some implementations, the uncertainty system can provide data indicative of a probability of future occupancy for a plurality of locations to a motion planning system of the autonomous vehicle. The motion planning system can generate one or more outputs including a motion plan based at least in part on the data indicative of the probability of future occupancy of the plurality of locations. In some examples, the vehicle computing system can generate a motion plan by inputting the data indicative of the probability of future occupancy to one or more machine learned models that are configured to generate motion plans for the autonomous vehicle. The vehicle computing system can obtain as output of the one or more machine learned models the motion plan which is based at least in part on the data indicative of the probability of future occupancy.

In some implementations, a vehicle computing system of an autonomous vehicle can include an uncertainty system that is configured to provide uncertainty data in the same space that the motion planning system of the vehicle computing system evaluates perception data and prediction data. More particularly, the uncertainty system can generate uncertainty data that is indicative of a probability of future occupancy for locations in a geographic area so as to better correlate the uncertainty data with the motion planning system and thereby, with overall performance by the vehicle computing system. The uncertainty system can provide full uncertainty representative of a probability of future occupancy that utilizes both the discrete probability per mode of a probability distribution, as well as the continuous uncertainty associated with probability distributions.

In accordance with some implementations, an uncertainty system can generate a probability of future occupancy by converting the shape of one or more objects into a probability of occupancy. The shape can be converted into a probability of occupancy by convolving an occupied area of an object with a probabilistic kernel that is indicative of a continuous uncertainty associated with the object. This approach may include obtaining data that is indicative of the continuous uncertainty associated with the object, and convolving the continuous uncertainty with the shape of the object to generate a probabilistic uncertainty for a trajectory of the object. The shape of the object can be represented using a polygon or other bounding box in some examples. In other examples, the shape of the object can further incorporate uncertainty such as by using a probability distribution to describe the object's occupancy. By generating a probability of future occupancy in such an output space, uncertainty can be closely related to how the motion planning system avoids locations possibly occupied by other objects. Additionally, the output space allows a measurement of errors in a variety of estimated values, including but not limited to, position, shape, and uncertainty. By contrast, an uncertainty based on position alone may accurately compare to reality in terms of position, but may have an incorrect estimation of an object's shape. By incorporating an output space uncertainty based on a probability of future occupancy, such errors in estimation are not problematic as the system can fully reason over the full probability of shape and position.

According to some implementations, the uncertainty system can estimate a probability mass for multiple locations in a geographic area at one or more future times. The probability mass for each location can be utilized to determine a probability of future occupancy for each of the locations in the geographic area. A probability mass can be determined for a particular object or actor in some examples. In other examples, a probability mass can represent a combined probability mass of multiple objects at a particular location at a particular time.

Various approaches may be utilized to determine a probability mass associated with a location and/or object. For example, the uncertainty system may utilize a probability density approach in some embodiments. In such an approach, the uncertainty system can determine an estimated probability of occupancy associated with one or more objects. Additionally, the uncertainty system can determine an occupancy area associated with the one or more objects. To estimate the probability mass, the uncertainty system can integrate the estimated probability of occupancy over the occupancy area occupied by an object. In some examples, sampling based methods may be utilized in combination with evaluating such an integral in the output space.

A probability density approach can provide an accurate measure of how well the system's estimates are to reality. For example, the integrated probability can directly correspond to how much probability mass was placed on an object's true occupied space, and can be applied to an arbitrary distribution. Such a method can also be used to estimate whether or not a given confidence interval places any probability mass on the true occupied space of an object. This approach may provide one way of interpreting prediction recall.

In another example, the uncertainty system may use a confidence intervals approach to determine probability mass. The uncertainty system can apply confidence intervals on a probability distribution to define regions in an output space. For example, a probability mass can be incorporated on a per mode basis, to balance the continuous uncertainty around high probability and low probability modes. This approach can be informed by how a motion planner operates. In some examples, low probability regions can be ignored. For example, the tails of a distribution that correspond to 5% of the overall probability mass may be ignored in some embodiments. In some instances, this can be accomplished by specifying the same confidence interval surrounding each mode. However, it is noted that for low probability modes this may include regions with far lower probability overall as compared to high probability modes.

In some confidence intervals approaches in accordance with the present disclosure, however, a level set can be defined on a total distribution such that a given percentage of the overall probability mass is captured. The level set may take more mass from high probability modes as compared to low probability modes. This can enable the motion planning system to guard against a wide variety of possible variations when something is more likely to occur, whereas the motion planning system can guard against a smaller variety of possible variations if something is less likely to occur. In some examples, confidence intervals can be defined per mode to capture a specific probability mass. When such an approach is applied to a largely disjointed gaussian mixture model (GMM), for example, each confidence interval can correspond to individual z-score regions per mode. When such an approach is applied to two identical Gaussian's with differing probabilities, the level set method may assign a larger confidence interval to a high probability mode, while applying a smaller confidence interval to a low probability mode, such as to retain only the center of the low probability mode in some examples. In some instances, confidence intervals can be applied to object trajectories with a modulating probability. By taking into account trajectory probabilities, the confidence intervals can be modulated such that the total probability mass of individual probability masses associated with each region sums to a predefined probability mass (e.g., 95%).

In some examples of a confidence intervals approach, the uncertainty system can obtain data indicative of a probability distribution having a plurality of probability modes. Each probability mode can correspond to a possible event (e.g., does an object exist, will a vehicle make a left turn, object position, speed of vehicle in making a left turn, etc.). The uncertainty system can define a level set of the probability distribution based at least in part on a predefined percentage of the probability mass. The level set can be configured to associate a larger confidence interval with a higher probability mode and a lower confidence interval with a lower probability mode. The probability mass can be a total probability mass and the probability distribution can be associated with trajectory probabilities of one or more objects. The uncertainty system can modulate the larger confidence interval and the lower confidence interval such that a first probability mass associated with the larger confidence interval and a second probability mass associated with the lower confidence interval sum to the predefined percentage of the total probability mass.

In some examples, a confidence intervals approach can represent a continuous uncertainty in a fair manner that corresponds to how the motion planning system operates. Such an approach can further provide statistical estimates on captured probability mass. For example, for a particular confidence interval percentage and a calibrated model, a number of estimates corresponding to the confidence interval percentage may fall within the defined regions. These regions may be polygonal such that precision and recall can be directly computed.

In some example implementations, a vehicle computing system may include a separate uncertainty system configured to determine uncertainty data including a probability of future occupancy. For example, the vehicle computing system may include an uncertainty system that receives one or more outputs of one or more machine-learned models of the perception system and/or prediction system. For instance, data indicative of an object detection, object state, and/or object classification may be provided from the appropriate machine-learned model to the uncertainty system. The uncertainty system may determine one or more discrete and/or continuous uncertainties associated with any one of the models, such as an uncertainty associated with whether the object was actually detected, an uncertainty associated with the state of the object, and/or an uncertainty associated with the classification of the object. In some examples, the external uncertainty system may receive one or more outputs of one or more machine-learned models of the prediction system. The uncertainty system can determine one or more discrete and/or continuous uncertainties associated with any one of the models of the prediction system. The uncertainty system can determine a probability of future occupancy for a plurality of locations in a geographic area based on the perception data, the prediction data, the perception uncertainty data, and/or the prediction uncertainty data. The uncertainty system can provide data indicative of the probability of future occupancy for the plurality of locations to the motion planning system of the autonomous vehicle.

In some examples, a separate uncertainty system can include one or more machine-learned models configured to generate data indicative of the probability of future occupancy of a plurality of locations in a geographic area. For example, sensor data can be input to a machine-learned system including the one or more machine-learned models configured to generate the data indicative of the probability of future occupancy of the plurality of locations. The uncertainty system can obtain as an output of the one or more machine-learned models, the data indicative of the probability of future occupancy of the plurality of locations.

In other example embodiments, an uncertainty system may be implemented within a perception system and/or prediction system. For example, the uncertainty system may be incorporated within one or more machine-learned models configured for object perception and/or object prediction. For example, a machine-learned model associated with object prediction may be configured to generate data indicative of a probability of future occupancy of locations in a geographic area, in addition to generating data indicative of object predictions. In some examples, an uncertainty system may be implemented partially within one or more machine-learned models and partially external to the one or more machine-learned models.

According to some implementations, a full uncertainty system may include a discrete/continuous uncertainty generator as well as a probability of occupancy generator. In some examples, the discrete/continuous uncertainty generator may receive perception data from the perception system and/or prediction data from the prediction system. For example, the discrete/continuous uncertainty generator may be configured to receive object detection data, object classification data, object state data, etc. as may be generated by one or more machine learned models of the perception system of the autonomous vehicle. Similarly, the discrete/continuous uncertainty generator may be configured to receive prediction data such as predicted trajectory data, predicted position data, predicted velocity data, predicted acceleration data, predicted heading data, or other information pertaining to a predicted state of an object. In some examples, the discrete/continuous uncertainty generator may be configured as part of one or more machine learned models of the perception system and/or the prediction system of the autonomous vehicle. In other examples, the discrete/continuous uncertainty generator may be configured externally to the perception system and the prediction system, such as within a standalone uncertainty system.

The discrete/continuous uncertainty generator can generate one or more discrete perception uncertainties, one or more discrete prediction uncertainties, one or more continuous perception uncertainties, and/or one or more continuous prediction uncertainties. For example, the discrete/continuous uncertainty generator can generate one or more discrete perception uncertainties and/or discrete continuous uncertainties such as detection uncertainties, state uncertainties, classification uncertainties, etc. relating to the perception system of the autonomous vehicle. Similarly, the discrete/continuous uncertainty generator can generate one or more discrete prediction uncertainties and/or continuous prediction uncertainties such as trajectory uncertainties, predicted state uncertainties, etc. relating to the prediction system of the autonomous vehicle.

The probability of occupancy generator, in some examples, can receive as input one or more discrete perception uncertainties, one or more discrete prediction uncertainties, one or more continuous perception uncertainties, and/or one or more continuous prediction uncertainties as can be generated by the discrete/continuous uncertainty generator. Additionally or alternatively, the probability of occupancy generator can receive perception data and/or prediction data directly from the perception system and/or prediction system. The probability of occupancy generator can generate a full uncertainty with respect to locations in a geographic area external to the autonomous vehicle based on the various uncertainties received from the discrete/continuous uncertainty generator. For example, the probability of occupancy generator can combine a plurality of uncertainties relating to various objects in a scene to provide a full uncertainty measurement associated with a probability of occupancy for particular locations within the scene.

According to some implementations, a probability of occupancy generator can be configured to receive sensor data as an input and directly generate a probability of occupancy for locations in a geographic area. For example, the probability of occupancy generator can include one or more machine learned models configured to receive raw sensor data and generate as an output one or more probabilities of occupancy associated with locations in a geographic area.

The systems and methods of the present disclosure provide a number of technical effects and benefits, particularly in the areas of autonomous vehicles and computing technology. An autonomous vehicle in accordance with embodiments of the disclosed technology may generate data indicative of a probability of future occupancy of locations in an environment external to the autonomous vehicle. Uncertainty data including the probability of future occupancy may be used by a vehicle computing system to improve autonomous vehicle operations. By way of example, the autonomous vehicle may utilize data indicative of a probability of future occupancy to generate improved motion plans. As a specific example, the use of data indicative of a probability of future occupancy can allow a motion planning system to reason over an output space that bounds a set of all possible object velocities and other measurements using estimates of observational uncertainty. The uncertainty system can continuously estimate an accurate probability of object motion to allow the motion planning system to reason over this space at all times. Such an approach may allow the system sufficient time in advance to plan for low probability events such as a last second movement of an object into the right of way of the autonomous vehicle. For instance, by reasoning over the probability that a yet to be detected object may enter the right of way from behind an occlusion, the motion planning system can quickly act if such an event were to actually occur.

By using full uncertainty that includes a probability of future occupancy associated with locations, a motion planning system can more effectively reason over possible events, and thereby improve the general operation of the autonomous vehicle. More specifically, the use of such full uncertainty can allow the propagation of low probability events through the vehicle computing system. This approach can force the motion planning system to hedge against the possibility that a low probability event may occur. This can enable the motion planning system to anticipate the need to potentially react in the future. By reasoning over full uncertainty, the system can be used to increase safety by evaluating both discrete and continuous uncertainties as a full uncertainty representation. This can be contrasted with approaches that use a simple mean or specific discrete samples without reasoning about uncertainty. The disclosed approach enables full reasoning over the continuous uncertainty.

The systems and methods described herein may provide a particular technical benefit to vehicle computing systems of autonomous vehicles, and in particular to the integration of uncertainty into motion planning. By computing uncertainty in the form of a probability of future occupancy that matches the space that motion planning uses to evaluate perception and prediction, the uncertainty data can be better correlated with the overall system performance of the autonomous vehicle. Such full uncertainty incorporates both discrete probability per mode and continuous uncertainty to provide comprehensive probability of occupancy data that the motion planning can reason over.

Computing probability of occupancy can provide a single metric that can be directly optimized in some examples. For example, computing probability of occupancy can provide a technique that attempts to place more probability mass at an actor's true location. Measuring against bounding regions with a confidence intervals approach can provide an ability to compute analogues to precision and recall. Recall may correspond to the percentage of object space that overlaps with a bounding region. In this manner, if the recall goes down by a large amount, it can be inferred that the system is failing to capture the space that an object occupies. Precision may correspond to the ratio of overlapping object space relative to a bounding box. In this manner, changes to precision can indicate modification of the overall sizes of the bounding regions.

In accordance with example embodiments of the disclosed technology, a probabilistic output space can be provided by utilizing full uncertainty. The full uncertainty can incorporate both discrete probability and continuous uncertainty. The uncertainty system can apply these techniques to an output space, thus describing a probability distribution of where an object is likely to be in the world. Such an approach can incorporate many possible changes in perception and prediction systems. For example, the result of such approach can be directly interpretable, either of the likelihood of occupancy or via precision and recall of estimates. Because these values are similar to how the motion planning system operates, differences in metrics may correlate with resulting changes in behavior of the vehicle computing system. In some instances, uncertainty data can be directly computed against the multimodal prediction of an object's motion. In this manner, the uncertainty data may change with changes to predictions, including motion estimates, discrete probabilities, continuous uncertainties, new modes, etc. Additionally, it is noted that upstream estimates in object shape, orientation, position, and/or velocity may also affect changes to downstream predictions of resulting object motion, and thus can be captured by such uncertainty data.

In accordance with example embodiments, the motion planning system can reason over the full uncertainty, and can be codified to protect against all uncertainty up to a predefined percentage. In some examples, the predefined percentage may be determined based on a validation of the vehicle computing system. For example, the perception system and prediction system can be fully validated for a predetermined percentage recall at a particular number of seconds. This recall can be computed over all objects in a specific operating domain, through the use of well calibrated uncertainty models for example. Accordingly, the predefined percentage of uncertainty that the motion planning system can protect against can be set to be equal to the percentage recall in some embodiments. In this manner, based upon the autonomous vehicle speed and distance to objects, the motion planning system can directly reason the probability of an actor occupying space based upon an ability to validate and operate at the recall percentage and the uncertainty percentage thresholds.

In accordance with some embodiments, prediction recall can be measured in order to determine whether the system is sufficiently predicting a given object motion. Given uncertainty data, a test system can be constructed as a system that provides a latent guarantee on recall. For example, the system can evaluate whether an additional prediction at some point in the past would have resulted in the recall for a given object to have been above a necessary threshold.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing systems 106; a communication network 108; a vehicle computing system 112; one or more autonomy system sensors 114; autonomy sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing systems 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing systems 106 can include one or more processors and one or more memory devices. The one or more memory devices can be used to store instructions that when executed by the one or more processors of the one or more remote computing systems 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing systems 106 can communicate (e.g., exchange data and/or signals) with one or more devices including the operations computing system 104 and the vehicle 102 via the communications network 108.

The one or more remote computing systems 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing systems 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing systems 106.

The vehicle 102 can be a ground-based vehicle (e.g., an automobile, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing system 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing systems 106) over one or more networks (e.g., via one or more wireless signal connections, etc.). In some implementations, the communications system 136 can allow communication among one or more of the systems on-board the vehicle 102. The communications system 136 can also be configured to enable the autonomous vehicle to communicate with and/or provide and/or receive data and/or signals from a remote computing system 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2A:
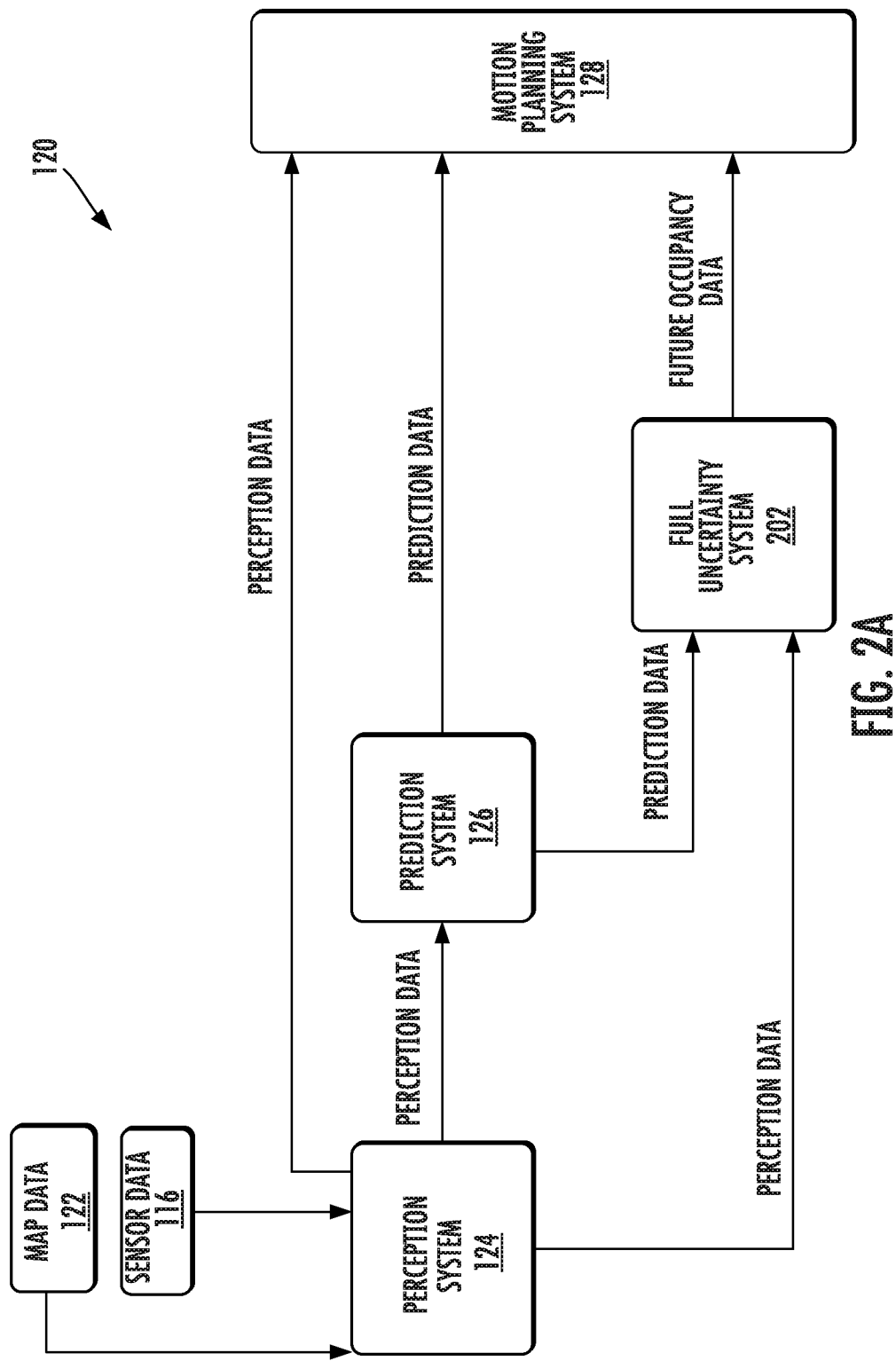
FIG. 2A depicts block diagram of an example vehicle computing system of an autonomous vehicle, including a full uncertainty system according to example embodiments of the present disclosure.

FIG. 2A depicts block diagram of an example vehicle computing system 112 of an autonomous vehicle, including a full uncertainty system 202 according to example embodiments of the present disclosure. An uncertainty system 202 in accordance with example embodiments of the disclosed technology may generate future occupancy data that is provided to a motion planning system 128 for use in generating motion plans for the autonomous vehicle. In some examples, the future occupancy data can include a probability of future occupancy based on perception data and/or prediction data. The perception data and the prediction data can be associated with one or multiple objects in a geographic area. A perception system 124 of a vehicle computing system 112 may include one or more first machine-learned models associated with detecting objects external to the autonomous vehicle. By way of example, the one or more first machine-learned models may include object detection models included as part of a segmentation or detection component of the perception system, object tracking models included as part of a tracking component of the perception system, and/or classification models included as part of a classification component of the perception system. Perception data generated by the perception system 124 may include object detection data, object state data (e.g., data relating to an object's position, velocity, acceleration, heading, or other information relative to an object's current state), object classification data, object tracking data, etc. A prediction system 126 of a vehicle computing system may include one or more machine-learned models associated with predicting a future state of an object. By way of example, a prediction system 126 may determine a predicted trajectory of an object, a predicted position of an object, a predicted velocity of an object, a predicted acceleration of an object, a predicted heading of an object, or other information pertaining to a predicted state of an object. The uncertainty system 202 may utilize perception data and/or prediction data to generate data indicative of a probability of future occupancy for locations.

In some examples, uncertainty system 202 can continuously estimate an accurate probability of an external object's location, and more particularly, a probability associated with the object occupying particular space in an environment. In addition to the uncertainty represented by the probability of a vehicle or other object moving, for instance, the uncertainty system can generate a probability of future occupancy for one or more locations in the environment around the object. In this manner, the various uncertainties associated with the object motion can be combined to form an overall probability of future occupancy of various locations by the object. The probability of future occupancy based on the possible movement of the object can be provided to the motion planning system 128. The motion planning system 128 can then reason over the output space incorporating the probability of occupancy of locations by the object in the future. The motion planning system 128 can reason over the full probability of the object movement represented in the probability of future occupancy of locations. The full uncertainty can be provided to the motion planning system 128 to enable a motion plan to be generated comprehensively based on full reasoning over the probabilities associated with the motion of the object.

The probability of future occupancy can be a per-object probability or a per-scene probability of future occupancy in example embodiments. For instance, the probability of future occupancy may indicate for a particular location, a probability of occupancy associated with a particular object at the particular location at a particular time. In other examples, the probability of future occupancy can be a per-scene or other probability that is indicative of a combined probability of occupancy associated with multiple objects. For instance, the probability of future occupancy may indicate for a particular location, a total probability of occupancy associated with multiple objects at the particular location at a particular time. Such an approach may include determining a combined probability of a plurality of objects occupying a particular location at a particular time. In this manner, the probability of occupancy can represent multiple discrete and/or continuous probabilities within an output space corresponding to a scene. For instance, the probability of occupancy for a location can incorporate discrete probabilities relating to detection (e.g., whether one or more objects are present), discrete probabilities relating to prediction (e.g., whether or not an object trajectory occurs), continuous probabilities relating to detection (e.g., a probability distribution representing multiple possible object classifications), and/or continuous probabilities relating to prediction (e.g., a probability distribution representing multiple object trajectories).

In some examples, the uncertainty system 202 may generate a probability of future occupancy of a location based on a perception data and/or prediction data associated with a single object. For instance, the uncertainty system can obtain data indicative of an uncertainty for an object detection and an uncertainty for an object prediction associated with a first object. The uncertainty system 202 can generate data indicative of the probability of future occupancy of a first location at a first time based at least in part on the data indicative of the uncertainty associated with the object detection and the data indicative of the uncertainty associated with the object prediction.

In other examples, the uncertainty system 202 may generate a probability of future occupancy of a location based on perception data and/or prediction data associated with multiple objects. In example embodiments, continuous estimates and uncertainties such as uncertainties in the motion prediction of other vehicles or pedestrians, can be combined. These multiple continuous uncertainties can be propagated to generate an overall probability of future occupancy of locations at future times. Data indicative of this overall probability of future occupancy can be provided to the motion planning system 128. By way of example, the uncertainty system 202 can determine data indicative of at least one uncertainty associated with one or more motion predictions associated with a first object. Similarly, the uncertainty system 202 can determine data indicative of at least one uncertainty associated with one or more motion predictions associated with a second object. The uncertainty system 202 can generate data indicative of a probability of future occupancy of a first location at a first time based at least in part on the data indicative of the at least one uncertainty associated with the one or more motion predictions associated with the first object and the data indicative of the at least one uncertainty associated with the one or more motion predictions associated with the second object.

The uncertainty system 202 can provide data indicative of a probability of future occupancy for a plurality of locations to motion planning system of the autonomous vehicle. The motion planning system can generate one or more outputs including a motion plan based at least in part on the data indicative of the probability of future occupancy of the plurality of locations. In some examples, the vehicle computing system can generate a motion plan by inputting the data indicative of the probability of future occupancy to one or more machine learned models that are configured to generate motion plans for the autonomous vehicle. The vehicle computing system can obtain as output of the one or more machine learned models the motion plan which is based at least in part on the data indicative of the probability of future occupancy.

Uncertainty system 202 can provide uncertainty data in the same space that the motion planning system of the vehicle computing system evaluates perception data and prediction data. More particularly, uncertainty system 202 can generate uncertainty data that is indicative of a probability of future occupancy for locations in a geographic area so as to better correlate the uncertainty data with the motion planning system and thereby, with overall performance by the vehicle computing system. The uncertainty system can provide full uncertainty representative of a probability of future occupancy that utilizes both the discrete probability per mode of a probability distribution, as well as the continuous uncertainty associated with probability distributions.

Figure 2B:
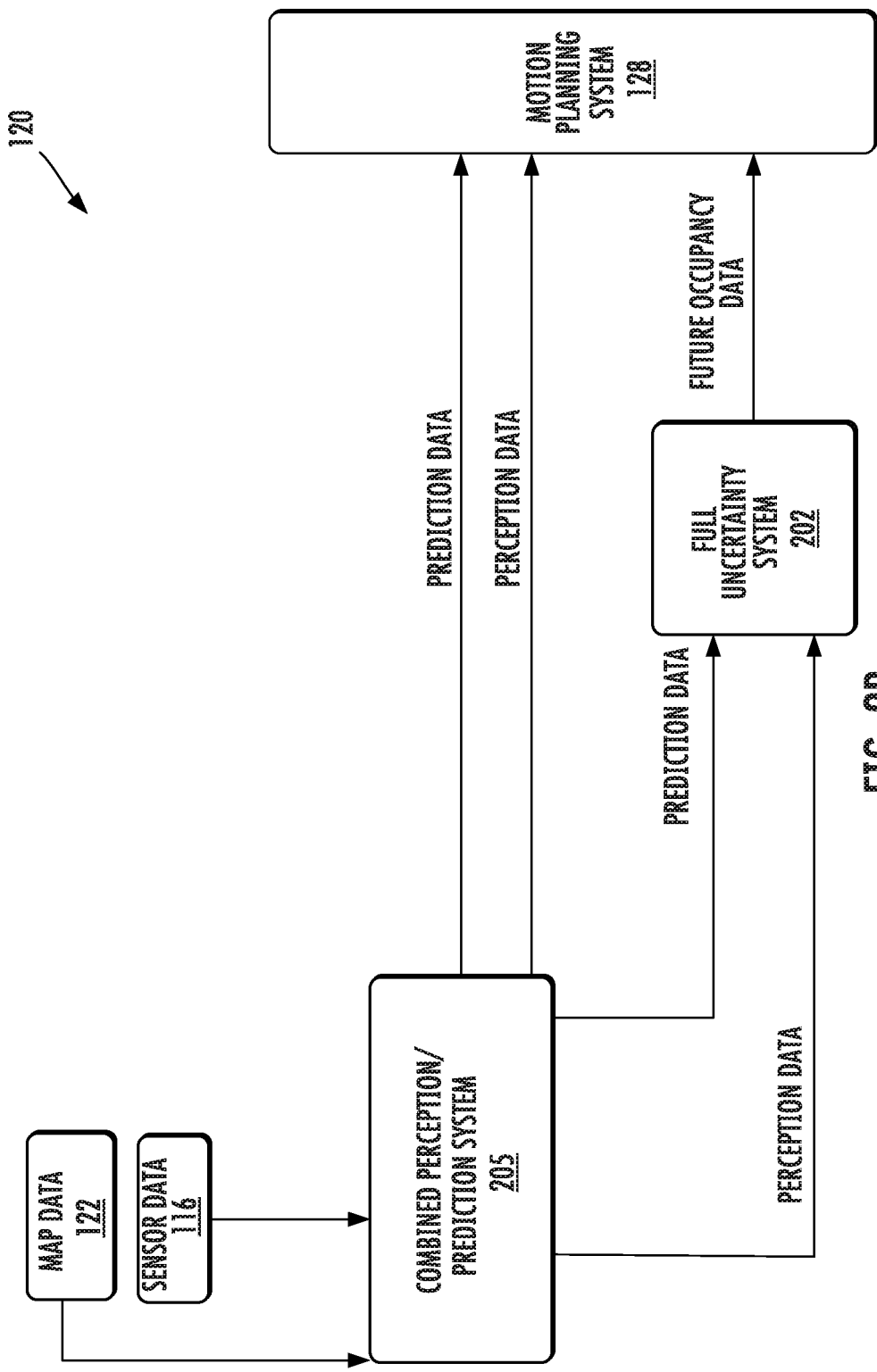
FIG. 2B depicts block diagram of an example vehicle computing system of an autonomous vehicle, including a full uncertainty system according to example embodiments of the present disclosure.

FIG. 2B depicts block diagram of an example vehicle computing system 112 of an autonomous vehicle, including a full uncertainty system 202 according to another example embodiment of the present disclosure. A combined perception/prediction system 205 can be configured to generate perception data and prediction data. In some examples, a combined perception/prediction system 205 may include one or more machine-learned models associated with detecting objects external to an autonomous vehicle and one or more machine-learned models associated with predicting a future state of an object. In some examples, the combined perception/prediction system may include one or more machine-learned models configured to detect objects and predict future states associated with the objects. By way of example, the one or more first machine-learned models may include combined object detection/prediction models that can generate object detection data, object tracking data, object classification data, object state data, predicted object trajectory data, predicted object position data, predicted object velocity data predicted object acceleration data, predicted object heading data, and/or other information pertaining to object perception and/or object prediction. An uncertainty system 202 in accordance with example embodiments of the disclosed technology may generate future occupancy data based on data from a combined perception/prediction system. In some examples, the future occupancy data can include a probability of future occupancy based on perception data, prediction data, and/or combined perception/prediction data. The perception data and the prediction data can be associated with one or multiple objects in a geographic area.

Figure 3:
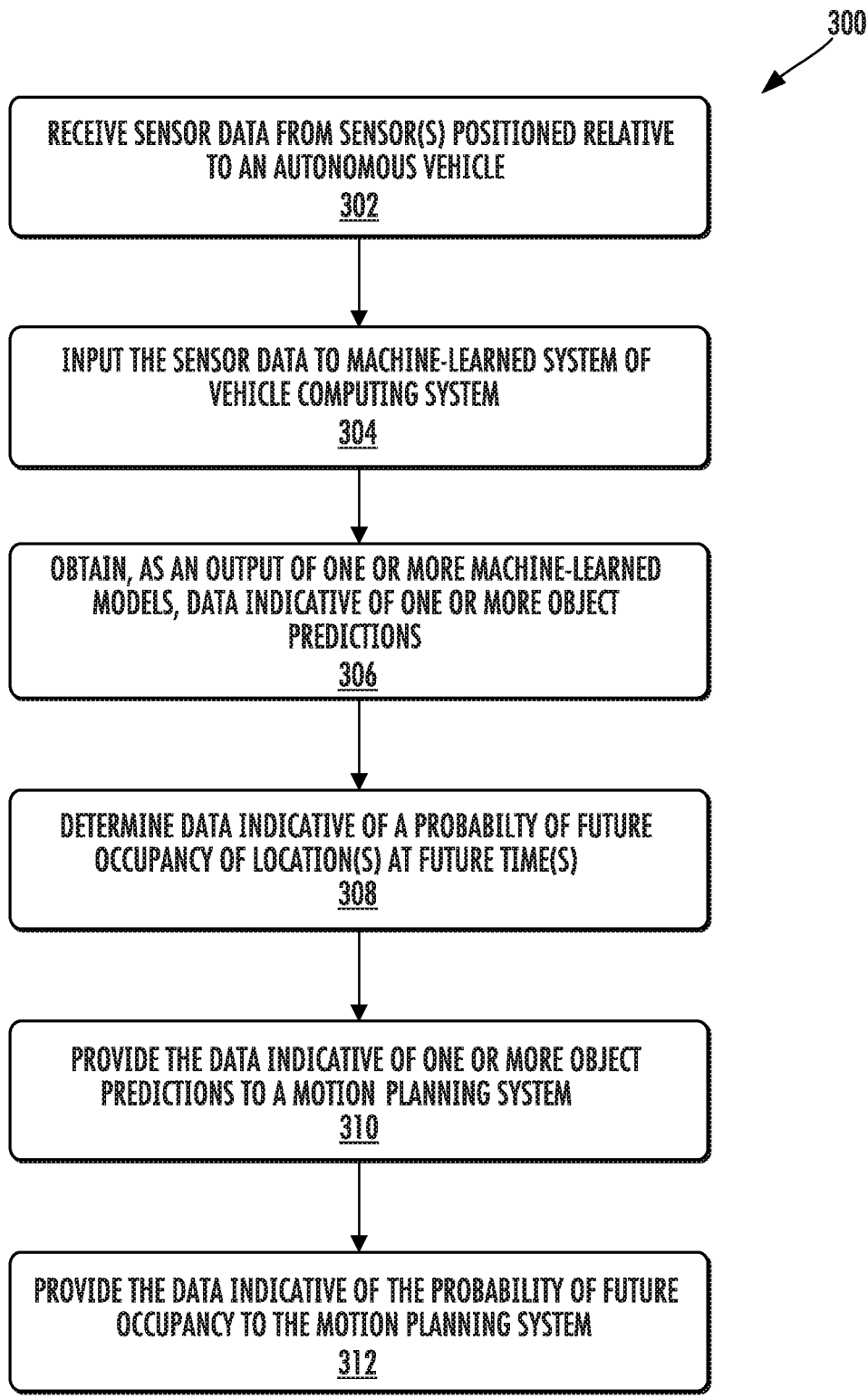
FIG. 3 depicts a flowchart diagram of an example process of generating data indicative of a probability of future occupancy of locations in an environment external to an autonomous vehicle according to example embodiments of the present disclosure.

FIG. 3 depicts a flowchart illustrating an example method 300 of generating data indicative of a probability of future occupancy of locations in an environment external to an autonomous vehicle according to example embodiments of the present disclosure. One or more portion(s) of the operations of method 300 and other methods described herein (e.g., methods 500, 600, and 700) can be implemented by one or more computing systems that include, for example, a vehicle computing system (e.g., vehicle computing system 112, etc.), one or more portions of an operations computing system (e.g., operations computing system 104, etc.), one or more remote computing systems (e.g., remote computing system 106), uncertainty computing system 800, computing system 1002, computing system 1030, full uncertainty system 202, and/or one or the like. Each respective portion of the methods described herein can be performed by any (or any combination) of the computing device(s) of the respective computing system. Moreover, one or more portion(s) of the methods described herein can be implemented as an algorithm on the hardware components of the device(s) described herein (e.g., as in FIGS. 1, 3, 4, 7-11). For example, method 300 can be implemented as an algorithm, for example, to generate data indicative of uncertainty and generate motions plans for an autonomous vehicle using the data. In example embodiments, method 300 may be performed by an uncertainty system 202, 400, and/or 450 of vehicle computing system 112.

FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 302, method 300 includes receiving sensor data from one or more sensors positioned relative to an autonomous vehicle. By way of example, sensor data may include one or more of image sensor data, RADAR sensor data, and/or LIDAR sensor data. It will be appreciated, however, that any type of sensor data may be utilized in accordance with embodiments of the disclosed technology.

At 304, method 300 includes inputting the sensor data to a machine-learned system of a vehicle computing system. By way of example, the machine-learned system may include one or more machine-learned models configured for object perception. For example, the one or more first machine-learned models may be object detector models provided as part of a segmentation component of a perception system. In other examples, the one or more first machine-learned models may be associated with one or more of object tracking and/or object classification. In some examples, the sensor data and/or data indicative of the one or more object detections can be input to one or more second machine-learned models configured for object prediction. In some examples, the sensor data can be input to one or more machine-learned models of a combined perception/prediction system configured to generate object perception data, objection prediction data, and/or combined object perception data and prediction data.

At 306, method 300 includes obtaining data indicative of one or more object predictions as an output of one or more machine-learned models of the machine-learned system. For example, the data may include predicted state data for one or more detected objects, such as a predicted position, velocity, and/or trajectory of an object. The object prediction data may be generated based at least in part on the uncertainty input with the data indicative of the one or more object detections. By way of example, an object predicted trajectory may be generated based on the uncertainty associated with the classification of the object. In another example, multiple predicted trajectories may be generated based on multiple classifications for a detected object and probabilities passed in association with each of the classifications. In some examples, data indicative of one or more detected objects can additionally be obtained as an output of one or more machine-learned models. The data may be one or more of object detection data, state data, or classification data associated with the one or more detected objects.

At 308, method 300 includes determining data indicative of a probability of future occupancy of one or more locations at one or more future times. By way of example, an uncertainty system can convert a shape of an object into a probability of occupancy by convolving an occupied area of the object with a continuous uncertainty associated with the object. Additionally or alternatively, the uncertainty system can convolve the continuous uncertainty associated with the object with the shape of the object to generate a probabilistic uncertainty for at least one trajectory of the object. The uncertainty system can determine data indicative of a probability of future occupancy of locations in an environment at one or more future times based at least in part on one or more motion predictions and/or the object detections in example embodiments.

At 310, the data indicative of one or more object predictions is provided to a motion planning system of the autonomous vehicle. The motion planning system can generate one or more motion plans based on one or more object predictions.

At 312, the data indicative of the probability of future occupancy is provided to the motion planning system of the autonomous vehicle. The motion planning system can generate one or more motion plans based on the one or more object predictions and the probability of future occupancy of the one or more locations. The data indicative of the probability of future occupancy can be provided to the motion planning system in addition to objection detection data and/or prediction data. The motion planning system can utilize the probability of future occupancy data to improve motion planning processes for the autonomous vehicle. Such an approach can provide full uncertainty with respect to locations by providing continuous estimates of an accurate probability of whether a particular location will be occupied by an object at a particular point in the future. In this manner, the motion planning system can fully reason over the uncertainty associated with a scene to deliver safety improvements to an overall autonomous driving system.

Figure 4A:
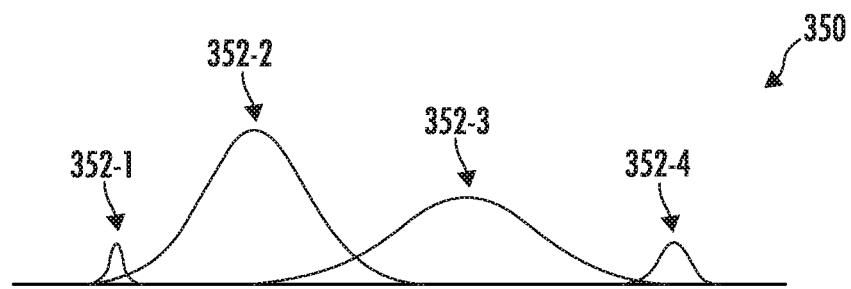
FIGS. 4A-4E depict graphical diagrams describing example processes for determining uncertainty, including an example determination of a full uncertainty associated with locations in an environment according to example embodiments of the present disclosure.
Figure 4B:
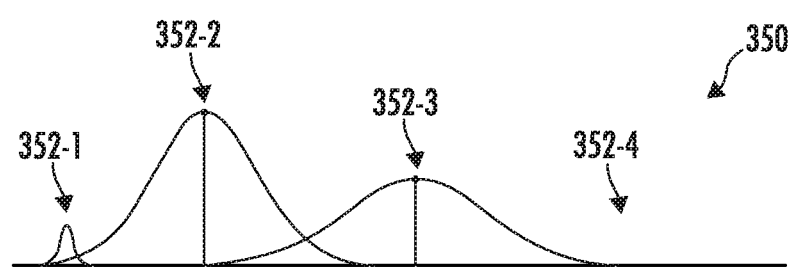
Figure 4C:
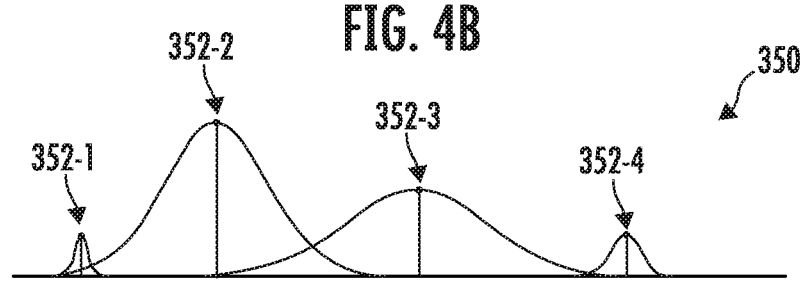
Figure 4D:
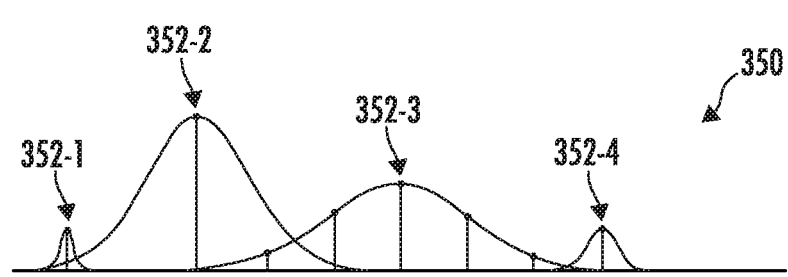
Figure 4E:
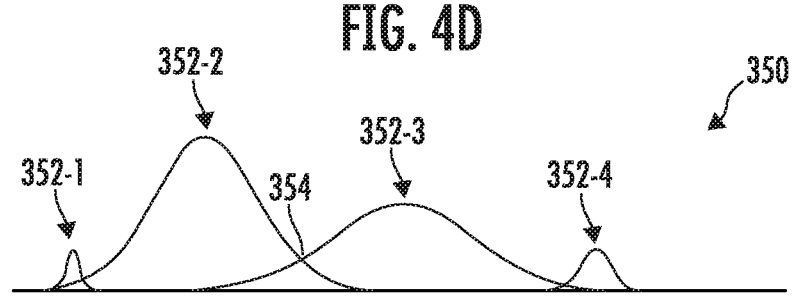

FIGS. 4A-4E are graphical diagrams describing example processes for determining uncertainty, including an example determination illustrated in FIG. 4E of a full uncertainty associated with locations in an environment proximate to an autonomous vehicle as can be represented by a probability of future occupancy. FIG. 4A depicts a Gaussian Mixture Model (GMM) 350 having individual modes 352. Each mode 352 corresponds to a normal distribution representing a given possible event. A GMM can be utilized to represent predictions of actors, capturing both the discrete probabilities of all possible events as well as the continuous set of variations for each. FIG. 4A provides an abstract representation of a simplified one-dimensional GMM including four modes.

Some systems may only propagate high probability events. Low probability events in such implementations may be culled at the source and not passed downstream. This technique may result in an autonomy system that performs well when estimates are close to reality, but with some amount of risk due to the low probability events being culled. FIG. 4B depicts a technique where the highest probability modes 352-2 and 352-3 are retained, and the other probability modes 352-1 and 352-4 (indicated by the dashed lines on low probability modes) are culled.

Some systems may utilize uncertainty by propagating additional low probability events. These systems can force an autonomy system to hedge against the possibility that a low probability event may occur, allowing the system to anticipate the need to potentially react in the future. FIG. 4C depicts a technique where additional low probability modes 352-1 and 352-4 are propagated such that a motion planner can vary its response to possible events based upon probability.

Some systems, in addition to propagating additional modes, add reasoning over continuous uncertainty through the generation of discrete samples at various confidence bounds on continuous uncertainty. FIG. 4D depicts an example where additional samples (shown by the dashed lines) can be used to increase safety by evaluating both the discrete and continuous uncertainties. Typically, these techniques utilize either the mean or specific discrete samples when reasoning about uncertainty.

In accordance with example embodiments of the present disclosure, a full uncertainty system is provided that can reason over continuous uncertainty that may be propagated amongst components of an autonomy system. FIG. 4E depicts an example of full uncertainty as can be determined in accordance with example embodiments of the present disclosure. Such full uncertainty pertains to the complete probability distribution, shown as the individual modes as well as the overall distribution 354 (dashed line). Various metrics and methods as outlined herein can provide greater intuition on analyzing such an overall distribution. In this manner, methodologies as described herein can incorporate continuous uncertainty more completely into metrics and technical approaches.

Figure 5:
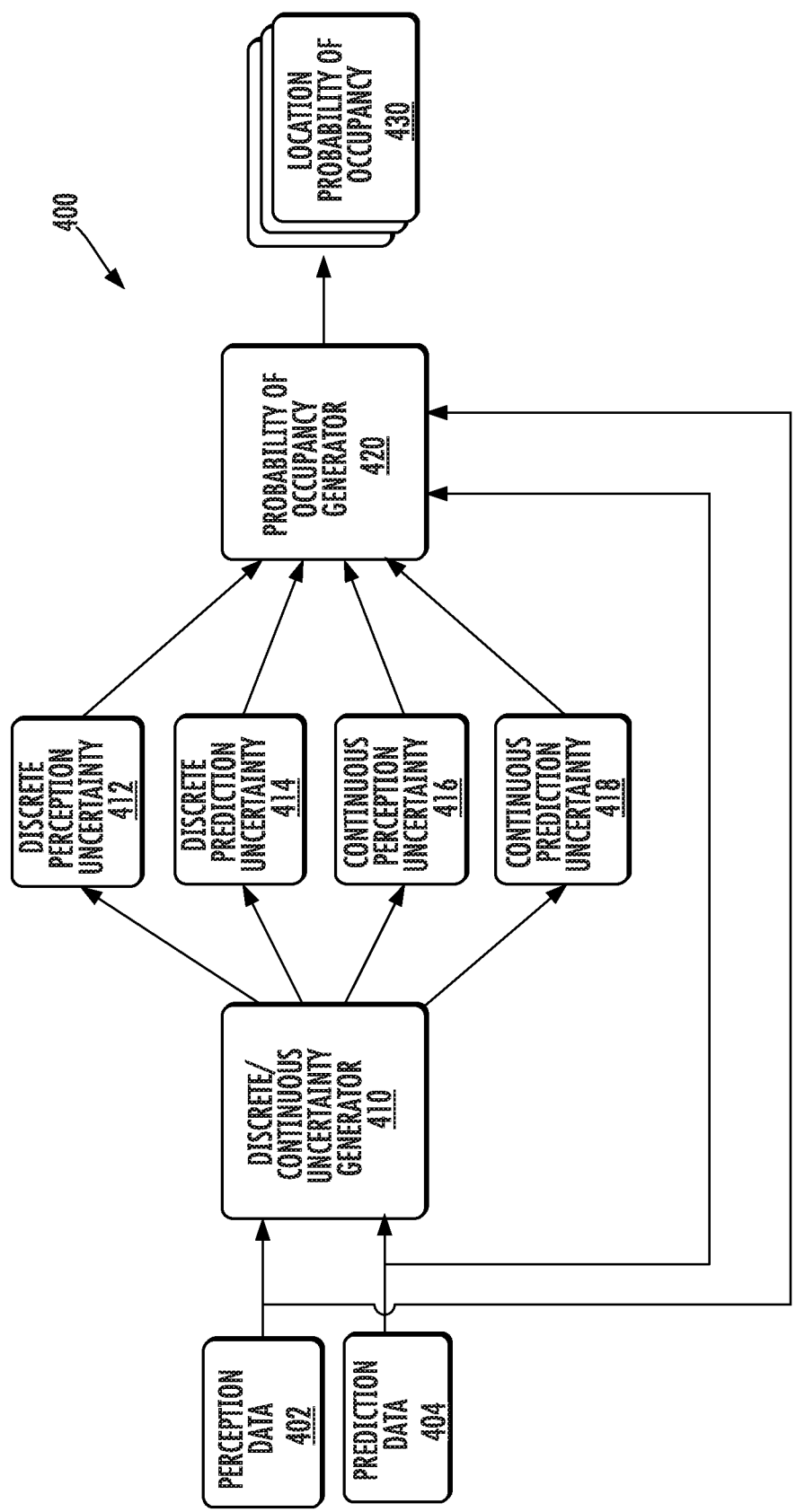
FIG. 5 depicts block diagram of an example full uncertainty system according to example embodiments of the present disclosure.

FIG. 5 depicts block diagram of an example full uncertainty system 400 according to example embodiments of the present disclosure. A vehicle computing system (e.g., vehicle computing system 112) may include a full uncertainty system 400 configured to determine uncertainty data including a probability of future occupancy such as a location probability of occupancy 430 as illustrated in FIG. 5. Full uncertainty system 400 can receive one or more outputs of one or more machine-learned models of a perception system and/or prediction system. For instance, perception data 402 can include data indicative of an object detection, object state, and/or object classification. Perception data 402 can be provided from the appropriate machine-learned model to the uncertainty system. Prediction data 404 can include data indicative of an object prediction, such as a predicted state, predicted trajectory, etc. associated with an object. Full uncertainty system 400 can include a discrete/continuous uncertainty generator 410 configured to generate uncertainty data.

The discrete/continuous uncertainty generator may receive perception data 402 from the perception system and/or prediction data 404 from the prediction system. For example, the discrete/continuous uncertainty generator may be configured to receive object detection data, object classification data, object state data, etc. as may be generated by one or more machine learned models of the perception system of the autonomous vehicle. Similarly, the discrete/continuous uncertainty generator may be configured to receive prediction data such as predicted trajectory data, predicted position data, predicted velocity data, predicted acceleration data, predicted heading data, or other information pertaining to a predicted state of an object. In some examples, the discrete/continuous uncertainty generator may be configured as part of one or more machine learned models of the perception system and/or the prediction system of the autonomous vehicle. In other examples, the discrete/continuous uncertainty generator may be configured externally to the perception system and the prediction system, such as within a standalone uncertainty system.

The uncertainty system can determine one or more discrete and/or continuous uncertainties associated with any one of the models of a perception system (e.g., perception system 124), prediction system (e.g., prediction system 126), and/or combined perception/prediction system (e.g., combined perception/prediction system 205). The discrete/continuous uncertainty generator 410 may generate data indicative of one or more discrete perception uncertainties 412 and/or one or more continuous perception uncertainties 416 associated with any one of the models of a perception system and/or a combined perception/prediction system. Perception uncertainties can include uncertainties associated with whether an object was actually detected, an uncertainty associated with the state of an object, and/or an uncertainty associated with the classification of an object. Continuous perception uncertainties can represent a full distribution of perception data, such as a full distribution of possible classifications for an object. The uncertainty system can determine data indicative of one or more discrete prediction uncertainties 414 and/or continuous prediction uncertainties 418 associated with any one of the models of the prediction system and/or the combined perception/prediction system. The discrete/continuous uncertainty generator can generate one or more discrete prediction uncertainties and/or continuous prediction uncertainties such as trajectory uncertainties, predicted state uncertainties, etc. relating to the prediction system of the autonomous vehicle. Continuous prediction uncertainties can represent a full distribution of prediction data, such as a full distribution of possible trajectories for an object.

The full uncertainty system 400 includes a probability of occupancy generator 420 that receives as input the data indicative of the discrete perception uncertainties 412, discrete prediction uncertainties 414, continuous perception uncertainties 416, and/or continuous prediction uncertainties 418. Additionally or alternatively, the probability of occupancy generator can receive perception data and/or prediction data directly from the perception system and/or prediction system. The probability of occupancy generator 420 can determine a location probability of occupancy 430 for a plurality of locations in a geographic area based on the perception data, the prediction data, the perception uncertainty data, and/or the prediction uncertainty data. The probability of occupancy generator can generate a full uncertainty with respect to locations in a geographic area external to the autonomous vehicle based on the various uncertainties received from the discrete/continuous uncertainty generator. For example, the probability of occupancy generator 420 can combine a plurality of uncertainties relating to various objects in a scene to provide a full uncertainty measurement associated with a probability of occupancy for particular locations within the scene. The uncertainty system 400 can provide data indicative of the location probability of occupancy 430 for the plurality of locations to the motion planning system of the autonomous vehicle.

According to some implementations, a probability of occupancy generator can be configured to receive sensor data as an input and directly generate a probability of occupancy for locations in a geographic area. For example, the probability of occupancy generator can include one or more machine learned models configured to receive raw sensor data and generate as an output one or more probabilities of occupancy associated with locations in a geographic area.

Figure 6:
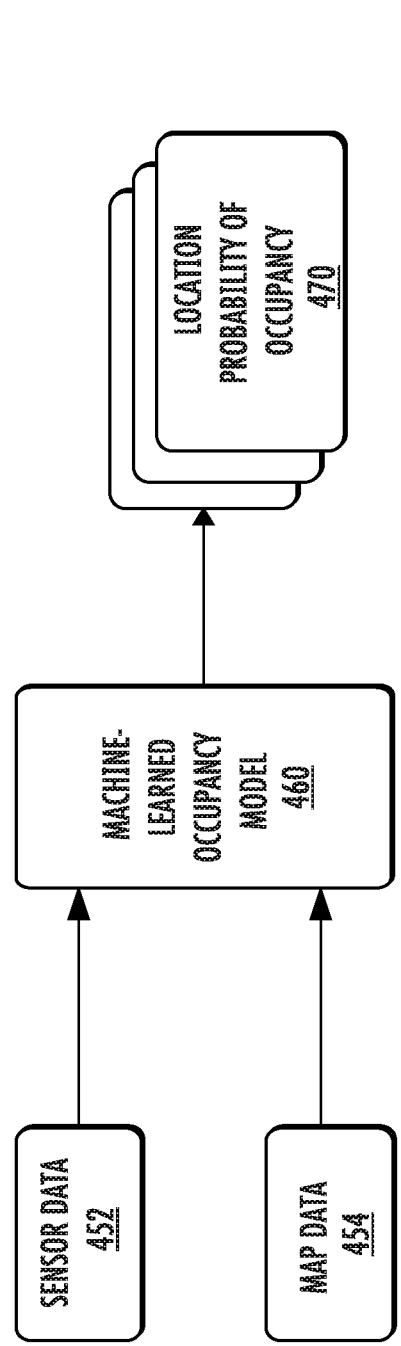
FIG. 6 depicts block diagram of an example full uncertainty system according to example embodiments of the present disclosure.

FIG. 6 depicts block diagram of an example full uncertainty system including a probability of occupancy generator 450. The probability of occupancy generator 450 includes a machine-learned occupancy model 460 according to example embodiments of the present disclosure. Machine-learned occupancy model 460 can receive sensor data 452 and/or map data 454. Machine-learned occupancy model 460 can include one or more machine-learned models configured to generate data indicative of a location probability of occupancy 470 of a plurality of locations in a geographic area. For example, sensor data 452 can be input to a machine-learned system including the one or more machine-learned models configured to generate the data indicative of the location probability of occupancy 470 of the plurality of locations. The uncertainty system can obtain as an output of the one or more machine-learned models, the data indicative of the location probability of occupancy 470 of the plurality of locations.

Figure 7:
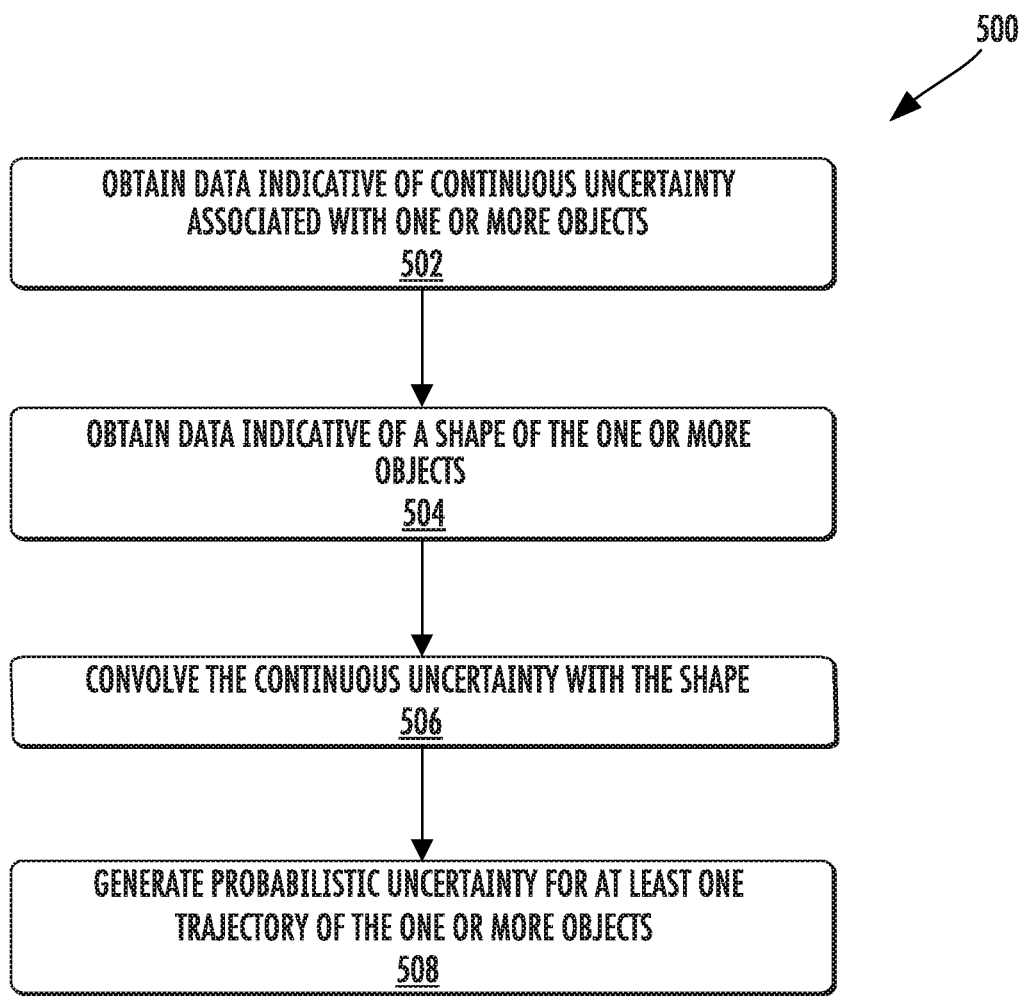
FIG. 7 depicts a flowchart diagram of an example process of generating a probabilistic uncertainty for a trajectory of an object according to example embodiments of the present disclosure.

FIG. 7 depicts a flowchart diagram of an example process of generating a probabilistic uncertainty for a trajectory of an object according to example embodiments of the present disclosure. In accordance with some implementations, an uncertainty system can generate probabilistic uncertainty that includes a probability of future occupancy by converting the shape of one or more objects into a probability of occupancy. The shape can be converted into a probability of occupancy by convolving an occupied area of an object with a probabilistic kernel that is indicative of a continuous uncertainty associated with the object. In example embodiments, method 500 may be performed by an uncertainty system 202, 400, and/or 450.

At 502, method 500 can include obtaining data that is indicative of the continuous uncertainty associated with one or more objects. According to example embodiments, the uncertainty of an object may be determined based at least in part on an object state, an object history, a local context associated with an object, and/or a global context associated with an object. The object state may include various parameters such as position, heading, shape, velocity, acceleration, etc. associated with an object. A tracking component of the perception system may provide an output including state and/or uncertainty data associated with the state of an object. The state information can be used with history data associated with object detections to determine an uncertainty. History information such as one or more previous object detections may be used to determine uncertainty associated with an object detection. Thus, the length of time or number of cycles during which an object has been detected and/or tracked can be used as part of a current object detection and uncertainty determination. For example, the system may use a classification or state associated with an object from a previous cycle as part of determining the classification or state of the object for a current cycle. More particularly, the uncertainty system may be configured to increase the uncertainty associated with an object if its classification or state changes between cycles, as this may be indicative of a lack of certainty in the detection or prediction. Additionally, a history of the uncertainty associated with an object can be used as part of determining a current object detection and uncertainty associated with the detection.

Additionally, the continuous uncertainty data can additionally or alternatively include prediction uncertainty data. Prediction uncertainty data can include data indicative of one or more uncertainties associated with predictions generated by prediction system. By way of example, prediction uncertainty data may include an uncertainty value associated with a predicated state of a detected object. The uncertainty may be an uncertainty with respect to a predicted position, velocity, acceleration, trajectory, etc. associated with a detected object. Various uncertainty value types may be used. For example, the uncertainty value can be a probability associated with a prediction generated by prediction system. In some examples, the probability can be a probability distribution associated with a prediction. For instance, the prediction system may generate two or more object predictions (e.g., multiple positions) and provide a probability distribution for the multiple predictions. The motion planning system can then use the object predictions and probability information as part of generating motion plans for the autonomous vehicle.

In some examples, a model configured to generate uncertainty data associated with object detections and/or object predictions may provide a continuous uncertainty in association with a perception system or prediction system output. Such a model can be trained by analyzing the joint probability of all outputs given a set of input data. As a specific example, a Bayesian binary classifier may be used in some examples, also referred to as a Gaussian naïve Bayes. Using such a model, underlying data can be analyzed to produce a true estimate of probabilities given a distribution of the inputs seen during training of the machine-learned model. A continuous uncertainty can be provided whereby the probability is continuous between a value of zero and one and is not a discrete value of zero or one as may be the case with the outputs of many classifiers. Uncertainty can be calibrated such that it is representative of a true distribution. A true probability distribution having a calibrated uncertainty may provide actionable levels of uncertainty. As a contrast, many discriminative models are trained to provide classifications for a most confident determination which is close to zero or one.

At 504, method 500 can include obtaining data indicative of a shape of the one or more objects. The shape of the object can be represented using a polygon or other bounding box in some examples. In some examples, the shape of the object can further incorporate uncertainty such as by using a probability distribution to describe the object's occupancy.

At 506, method 500 can include convolving the continuous uncertainty with the shape of the one or more objects. At 508, method 500 can include generating a probabilistic uncertainty for a trajectory of the object. By generating a probability of future occupancy in such an output space, uncertainty can be closely related to how the motion planning system avoids locations possibly occupied by other objects. Additionally, the output space allows a measurement of errors in a variety of estimated values, including but not limited to, position, shape, and uncertainty. By contrast, an uncertainty based on position alone may accurately compare to reality in terms of position, but may have an incorrect estimation of an object's shape. By incorporating an output space uncertainty based on a probability of future occupancy, such errors in estimation are not problematic as the system can fully reason over the full probability of shape and position.

FIG. 8 depicts a graphical diagram illustrating a process 550 of measuring probabilistic occupancy according to example embodiments of the present disclosure. An actor's shape can be converted into a probability of occupancy using process 550. With the described technique, actors are represented as a shape in the world that the actor occupies. This can be contrasted with techniques that estimate actor position by estimating a single point corresponding to the centerpoint of an actor, using continuous uncertainty to represent possible error in that estimate.

In FIG. 8, an object is represented as an occupied area 552 and a Gaussian kernel 554 represents a continuous uncertainty in actor position. An object's estimated shape can be represented with the area occupied by the actor. The object's estimated shape as represented by occupied area 552 can be convolved with an uncertainty in the estimated position of the object (e.g., at the centerpoint) represented by the Gaussian kernel 554, resulting in a probability of occupancy 556. The occupied area 552 can be convolved with the Gaussian kernel 554 to generate a probability of occupancy 556. This can be the output space of an estimate.

FIG. 8 depicts an example in one dimension. The same concept can be applied in multiple dimensions such as in the two-dimensional example illustrated in FIG. 9. FIG. 9 depicts a graphical diagram illustrating a process 570 of measuring probabilistic occupancy to describe trajectories with a continuous uncertainty. In the example of FIG. 9, uncertainty in the shape of an actor is incorporated, such as by using a probability distribution to describe the object's occupancy rather than a simple polygon. FIG. 9 depicts a visualization of two trajectories 572 with continuous uncertainty. The left plot shows a continuous uncertainty 574 of the object's position. The second plot has been convolved by a rectangular actor polygon to show probabilistic occupancy 576. In some examples, metrics can be built in this output space, as it may closely relate to how a motion planning system avoids spaces possibly occupied by other objects. The output space may allow the system to measure errors in a variety of estimated values such as position, shape, and uncertainty. By comparison, a metric on position alone could be perfect compared to reality, but the object's shape may have been estimated incorrectly. Using metrics in the output space as described can avoid such issues.

According to some implementations, the uncertainty system can estimate a probability mass for multiple locations in a geographic area at one or more future times. The probability mass for each location can be utilized to determine a probability of future occupancy for each of the locations in the geographic area. A probability mass can be determined for a particular object or actor in some examples. In other examples, a probability mass can represent a combined probability mass of multiple objects at a particular location at a particular time.

Various approaches may be utilized to determine a probability mass associated with a location and/or object. For example, the uncertainty system may utilize a probability density approach in some embodiments. In such an approach, the uncertainty system can determine an estimated probability of occupancy associated with one or more objects. Additionally, the uncertainty system can determine an occupancy area associated with the one or more objects. To estimate the probability mass, the uncertainty system can integrate the estimated probability of occupancy over the occupancy area occupied by an object. In some examples, sampling based methods may be utilized in combination with evaluating such an integral in the output space.

Figure 10:
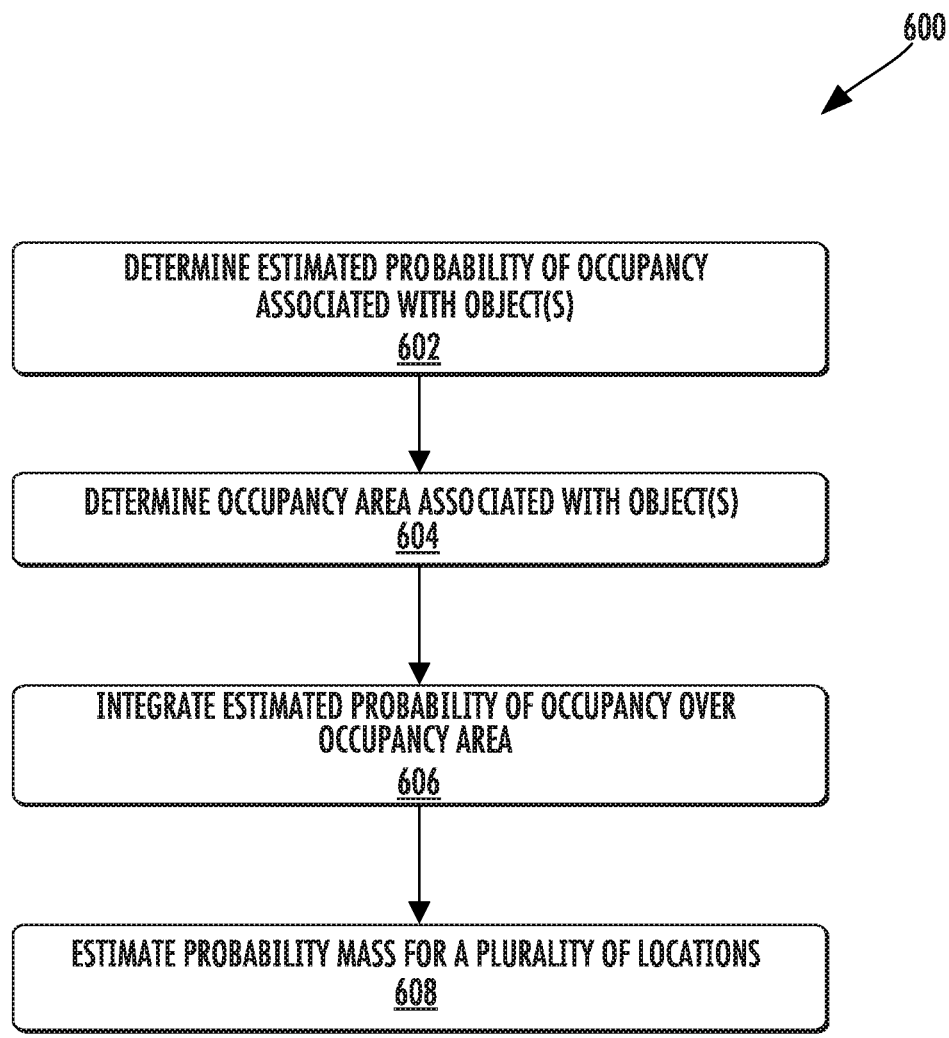
FIG. 10 depicts a flowchart diagram of an example process of estimating probability mass for locations in an environment external to an autonomous vehicle using a probability density approach according to example embodiments of the present disclosure.

FIG. 10 depicts a flowchart diagram of an example process of estimating probability mass for locations in an environment external to an autonomous vehicle using a probability density approach according to example embodiments of the present disclosure. In example embodiments, method 600 may be performed by an uncertainty system 202, 400, and/or 450.

At 602, method 600 includes determining an estimated probability of occupancy associated with one or more objects. In some examples, a probability of occupancy can be determined using a technique as depicted in FIG. 8 or FIG. 9 to represent an object as an occupied area which, when convolved with a Gaussian kernel results in a probability of occupancy. A probability of occupancy can be calculated in one or more dimensions. In some examples, uncertainty in the shape of an object can be incorporated, such as by using a probability distribution to describe the object's occupancy. Other approaches may be used.

Figure 11:
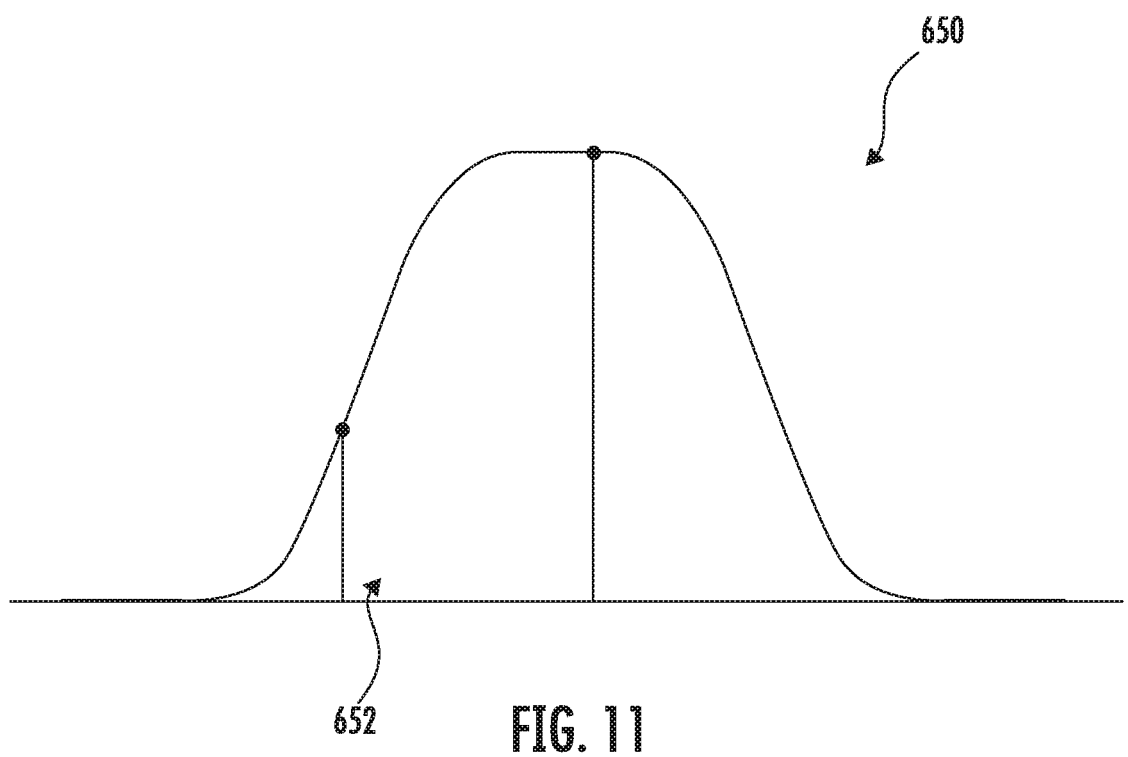
FIG. 11 depicts a graphical diagram illustrating a process of estimating probability mass using a probability density approach according to example embodiments of the present disclosure.

At 604, method 600 includes determining an occupancy area associated with the one or more objects. FIG. 11 depicts one example of determining an occupancy area associated with an object. FIG. 11 depicts a graphical diagram illustrating a process 650 of estimating probability mass using a probability density approach according to example embodiments of the present disclosure. For instance, the probability of occupancy determined at 602 can be used to determine an occupancy area 652. An object can be assumed to occupy the space between the two vertical lines in the probability of occupancy distribution to determine an occupancy area in some examples.

At 606, method 600 includes integrating the estimated probability of occupancy over the occupancy area. At 608, method 600 includes estimating the probability mass for a plurality of locations based on the integration of the estimated probability of occupancy over the occupancy area. Various techniques can be used to evaluate an integral in the output space. A standard integral-based approach can be used. To reduce computational expense, sampling-based methods can be used in other examples. For instance, a Monte Carlo approach can be used. A Monte Carlo approach provides an accurate measure of how "good" an estimate is, as the integrated probability can directly correspond to how much probability mass was placed on an actor's true occupied space, and can be applied to arbitrary distributions.

A Monte Carlo method can also be used to estimate whether or not a given confidence interval places any probability mass on the true object's occupied space, which is one way of interpreting recall. For instance, if there is a confidence that 6% of samples overlap with a true object's occupied space, then at least 1% of the 95% confidence interval does. If the motion planner has been informed to guard against 95% of outcomes, for instance, this can provide recall signal.

A probability density approach can provide an accurate measure of how well the system's estimates are to reality. For example, the integrated probability can directly correspond to how much probability mass was placed on an object's true occupied space, and can be applied to an arbitrary distribution. Such a method can also be used to estimate whether or not a given confidence interval places any probability mass on the true occupied space of an object. This approach may provide one way of interpreting prediction recall.

Figure 12:
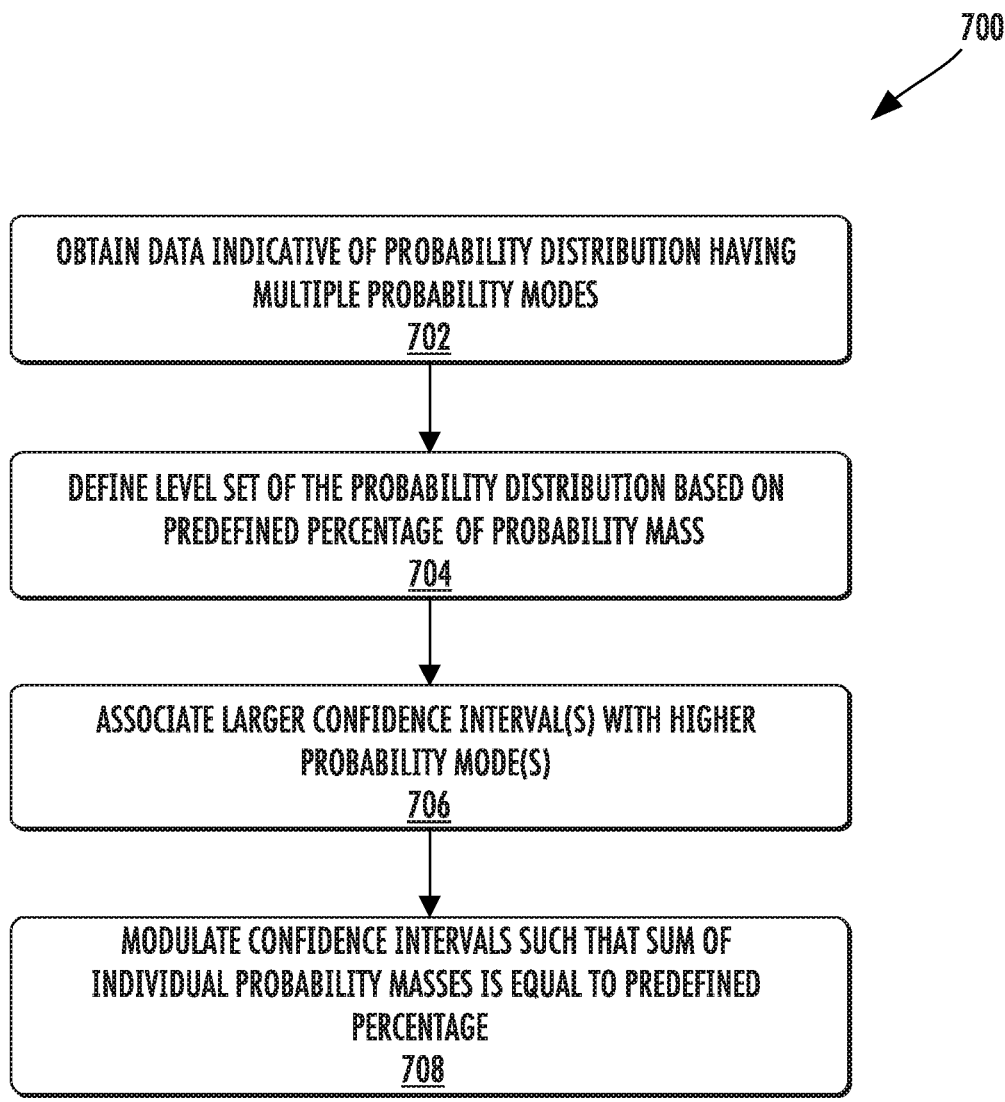
FIG. 12 depicts a flowchart diagram of an example process of estimating probability mass for locations in an environment external to an autonomous vehicle using a confidence intervals approach according to example embodiments of the present disclosure.

FIG. 12 depicts a flowchart diagram of an example process of estimating probability mass for locations in an environment external to an autonomous vehicle using a confidence intervals approach according to example embodiments of the present disclosure. In example embodiments, method 600 may be performed by an uncertainty system 202, 400, and/or 450.

At 702, method 700 includes obtaining data indicative of a probability distribution having multiple modes. Each probability mode can correspond to a possible event (e.g., does an object exist, will a vehicle make a left turn, object position, speed of vehicle in making a left turn, etc.). The uncertainty system can apply confidence intervals on a probability distribution to define regions in an output space. For example, a probability mass can be incorporated on a per mode basis, to balance the continuous uncertainty around high probability and low probability modes. This approach can be informed by how a motion planner operates.

At 704, method 700 includes defining a level set of the probability distribution based on a predefined percentage of probability mass. The uncertainty system can define a level set of the probability distribution based at least in part on a predefined percentage of the probability mass.

At 706, method 700 includes associating larger confidence intervals with higher probability modes. In some examples, the level set can be configured to associate a larger confidence interval with a higher probability mode and a lower confidence interval with a lower probability mode. The probability mass can be a total probability mass and the probability distribution can be associated with trajectory probabilities of one or more objects.

In some examples, low probability regions can be ignored. For example, the tails of a distribution that correspond to 5% of the overall probability mass may be ignored in some embodiments. In some instances, this can be accomplished by specifying the same confidence interval surrounding each mode. However, it is noted that for low probability modes this may include regions with far lower probability overall as compared to high probability modes.

In some examples, however, a level set can be defined on a total distribution such that a given percentage of the overall probability mass is captured. The level set may take more mass from high probability modes as compared to low probability modes. This can enable the motion planning system to guard against a wide variety of possible variations when something is more likely to occur, whereas the motion planning system can guard against a smaller variety of possible variations if something is less likely to occur. In some examples, confidence intervals can be defined per mode to capture a specific probability mass. When such an approach is applied to a largely disjointed gaussian mixture model (GMM), for example, each confidence interval can correspond to individual z-score regions per mode. When such an approach is applied to two identical Gaussian's with differing probabilities, the level set method may assign a larger confidence interval to a high probability mode, while applying a smaller confidence interval to a low probability mode, such as to retain only the center of the low probability mode in some examples.

At 708, method 700 includes modulating the confidence intervals such that a sum of the individual probability mass is equal to the predefined percentage. In some instances, confidence intervals can be applied to object trajectories with a modulating probability. By taking into account trajectory probabilities, the confidence intervals can be modulated such that the total probability mass of individual probability masses associated with each region sums to a predefined probability mass (e.g., 95%). The uncertainty system can modulate the larger confidence interval and the lower confidence interval such that a first probability mass associated with the larger confidence interval and a second probability mass associated with the lower confidence interval sum to the predefined percentage of the total probability mass.

In some examples, a confidence intervals approach can represent a continuous uncertainty in a fair manner that corresponds to how the motion planning system operates. Such an approach can further provide statistical estimates on captured probability mass. For example, for a particular confidence interval percentage and a calibrated model, a number of estimates corresponding to the confidence interval percentage may fall within the defined regions. These regions may be polygonal such that precision and recall can be directly computed.

Figure 13:
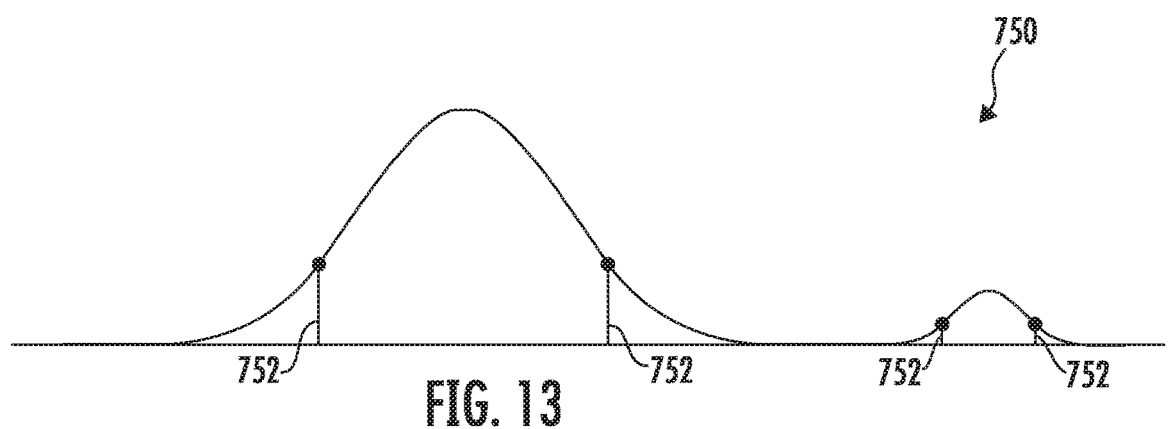
FIG. 13 depicts a graphical diagram illustrating confidence intervals per mode of a probability distribution using the same percentage bounds according to example embodiments of the present disclosure.

The incorporation of probability mass may include specifying the same confidence interval surrounding each mode. FIG. 13 depicts a graphical diagram illustrating a confidence intervals per mode of a probability distribution 750 using the same percentage bounds 752 according to example embodiments of the present disclosure. Defining confidence intervals per mode with the same percentage bounds 752 can result in lower probability regions for some modes.

Figure 14:
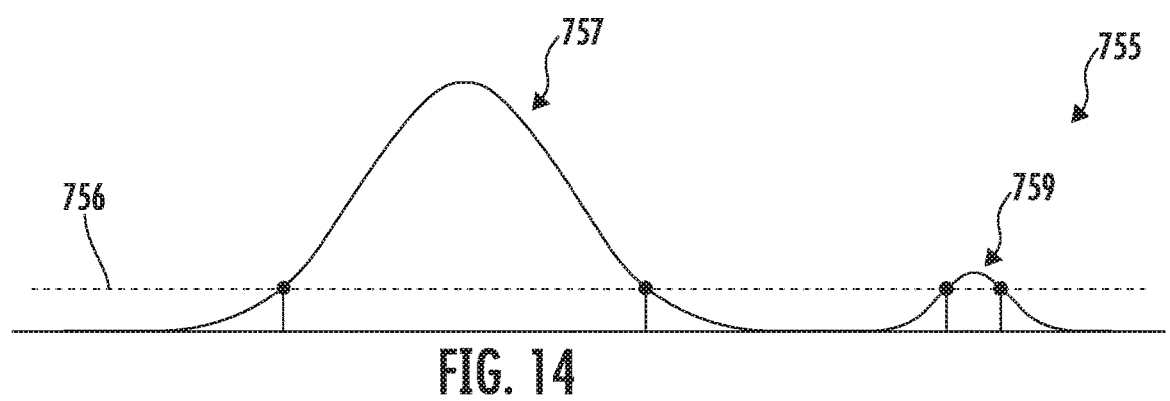
FIG. 14 depicts a graphical diagram illustrating confidence intervals per mode of a probability distribution as applied to a Gaussian mixture model.
Figure 15:
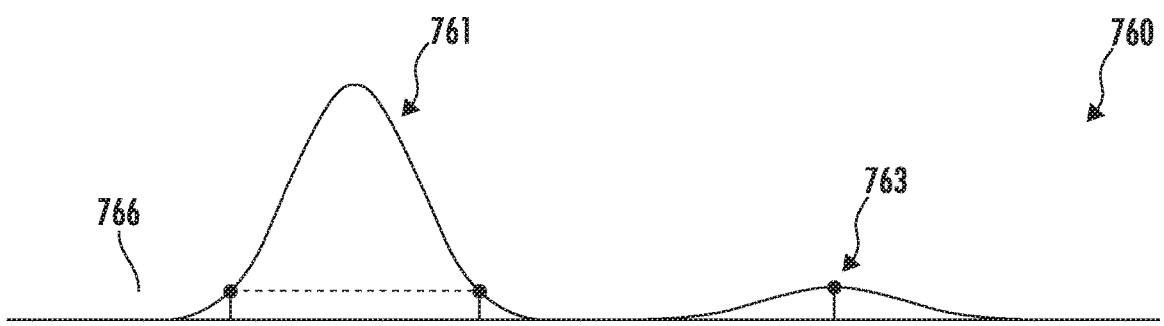
FIG. 15 depicts a graphical diagram illustrating confidence intervals per mode of a probability distribution as applied to identical Gaussians with differing probabilities.

FIG. 14 depicts a graphical diagram illustrating confidence intervals per mode of a probability distribution as applied to a Gaussian mixture model. In this approach a level set 756 is defined on the total distribution such that a given percentage of the overall probability mass is captured. The level set can take more mass from high probability modes (e.g., mode 757) compared to low probability modes (e.g., mode 759). This approach may make intuitive sense. If something is 95% likely to occur for example, this approach can provide a guard against a wide variety of possible variations. Alternatively, if something is only 5% likely to occur, this approach can guard again a smaller region which may be sufficient. Confidence intervals, per mode, are defined to capture a specific probability mass using a level set 756. When applied to a GMM (e.g., largely disjoint GMM), each confidence interval corresponds to individual z-score regions per mode. FIG. 15 depicts a graphical diagram illustrating confidence intervals per mode of a probability distribution as applied to identical Gaussians with differing probabilities using a level set 766. For two identical Gaussians with differing probabilities, the level set method described herein can assign a larger confidence interval to the high probability mode 761, retaining only the center of the low probability mode 763.

Figure 16:
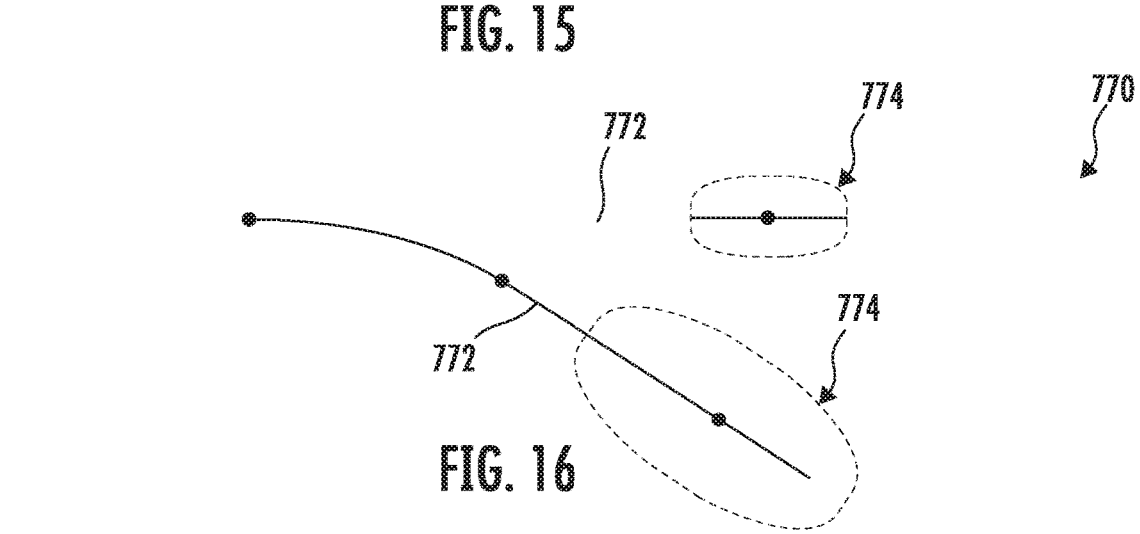
FIG. 16 depicts a graphical diagram illustrating an example process of applying confidence intervals to trajectories with a modulating probability.

FIG. 16 depicts a graphical diagram illustrating an example process 770 of applying confidence intervals to trajectories 772 with a modulating probability. As illustrated in FIG. 16, trajectory probabilities 774 can be taken into account, and the confidence intervals can be modulated such that the total probability mass of the two regions sums to 95%. In some examples, this approach can use a computation that relies upon having largely disjoint modes. In other examples, the predicted trajectory waypoints can be guaranteed to be disjoint, for example, through the use of tree and graph-based representations of predicted trajectories.

Figure 17:
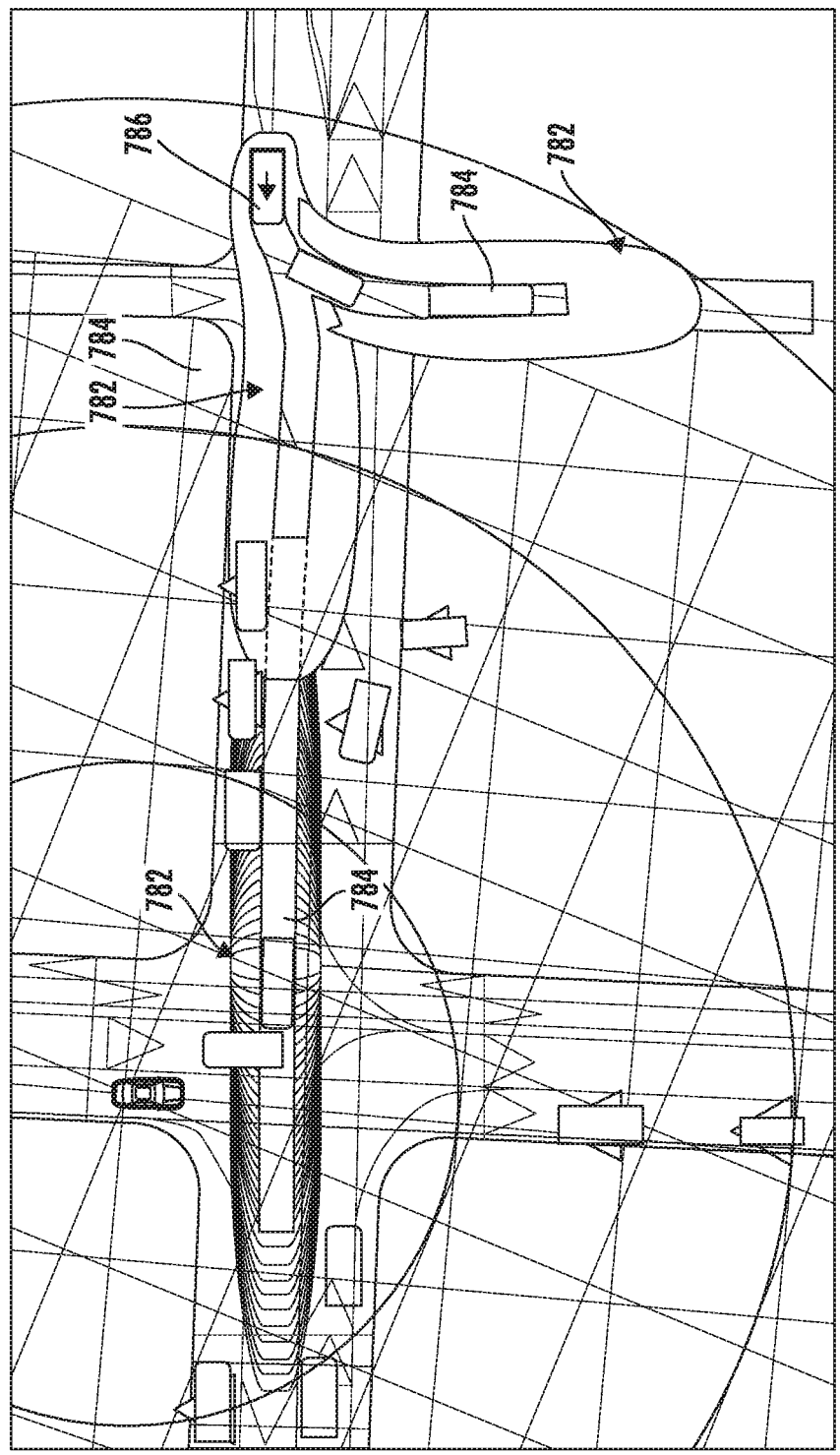
FIG. 17 depicts a graphical diagram illustrating confidence intervals as applied over object polygons to obtain regions and output space according to example embodiments of the present disclosure.

One benefit of using a confidence interval mode is that continuous uncertainty can be represented in a fair way that corresponds to how a motion planning system operates, while providing statistical estimates on captured probability mass. For instance, for a 95% confidence interval and a calibrated model, it can be expected that 95% of estimates may fall within the defined regions. FIG. 17 depicts a graphical diagram illustrating confidence intervals as applied over object polygons to obtain regions in output space according to example embodiments of the present disclosure. FIG. 17 shows confidence intervals applied over the actor polygons to obtain regions 782 in output space. The regions 782 are shown for several predicted trajectories 784 for a given object 786. As shown in FIG. 17, these regions 782 can be computed efficiently. As these regions correspond to polygonal regions, precision and recall can be directly computed. In some examples, this technique can enable measuring metrics against bounding regions. By contrast, a probabilistic approach can attempt to accurately estimate captured probability mass.

Computing probability of occupancy can provide a single metric that can be directly optimized, for example, by attempting to place more probability mass at the actor's true location. Measuring against bounding regions can provide an ability to compute analogues to precision and recall. Precision and recall are well understood concepts that make intuitive sense when describing metrics. Recall can represent the percentage of actor space overlapping with a bounding region. Precision represents the ratio of overlapping actor space relative to the bounding region size. If recall goes down, it may indicate that a system is failing to capture the space that an object occupies. If precision changes, the system is likely modifying the overall sizes of bounding regions.

Figure 18:
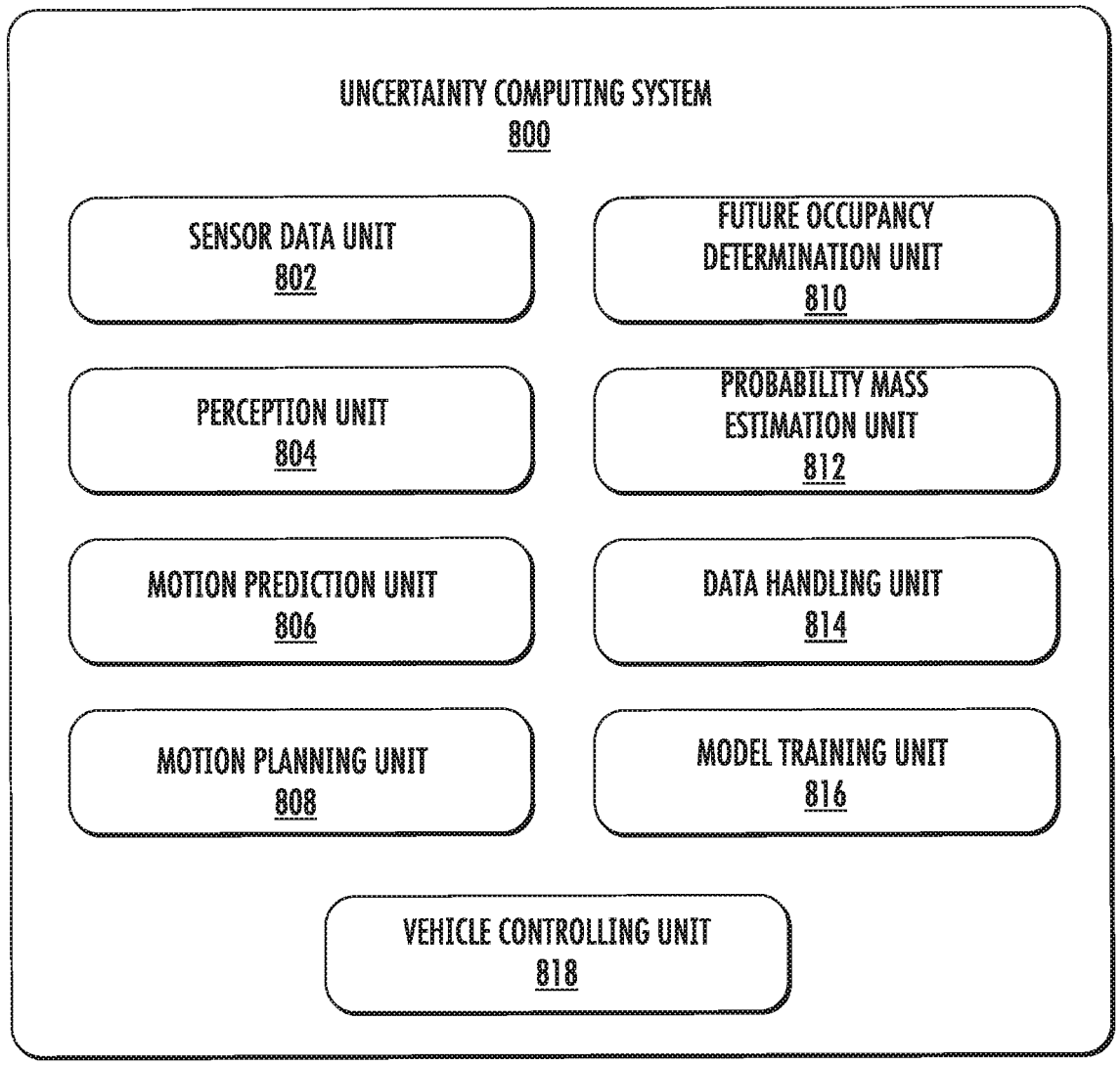
FIG. 18 depicts example system units for performing operations and functions according to example embodiments of the present disclosure.

Various means can be configured to perform the methods and processes described herein. For example, FIG. 18 depicts a block diagram of an example computing environment that includes various means according to example embodiments of the present disclosure. For example, uncertainty computing system 800 can include sensor data unit(s) 802, perception unit(s) 804, motion prediction unit(s) 806, motion planning unit(s) 808, future occupancy determination unit(s) 810, probability mass estimation unit(s) 812, data handling unit(s) 814, model training unit(s) 816, vehicle controlling unit(s) 818, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., method 300, method 500, method 600, and method 700) and/or other operations described herein can be implemented as such algorithm(s). For instance, the means (e.g., sensor data unit(s) 802) can be configured to obtain sensor data associated with one or more sensors of an autonomous vehicle. A sensor data unit is one example of a means for obtaining such data as described herein.

The means (e.g., perception unit(s) 804) can be configured to generate perception data associated with an autonomous vehicle. A perception unit is one example of a means for generating such data as described herein. A perception unit can provide as an output of one or more machine-learned models, data indicative of one or more objects detected by a machine-learned system. The means (e.g., motion prediction unit(s) 806) can be configured to generate motion prediction data associated with one or more objects. A motion prediction unit can provide as an output of one or more machine-learned models, data indicative of one or more motion predictions associated with one or more objects detected by a machine-learned system. A motion prediction unit is one example of a means for generating such data as described herein.

The means (e.g., motion planning unit(s) 808) can be configured to generate motion plans associated with an autonomous vehicle based at least in part on data indicative of a probability of future occupancy of a plurality of locations. The means can generate a motion plan based at least in part on data indicative of the probability of future occupancy of a plurality of locations. A motion planning unit is one example of a means for generating motion plans as described herein.

The means (e.g., future occupancy determination unit(s) 810) can be configured to determine data indicative of a probability of future occupancy of a plurality of locations in an environment at one or more future times based at least in part on data indicative of one or more motion predictions associated with one or more objects and a probability of occupancy of the one or more objects. In some examples, the means can convert a shape of one or more objects detected by a machine-learned system into a probability of occupancy by convolving an occupied area of the one or more objects with a continuous uncertainty associated with the one or more objects. A future occupancy determination unit is one example of a means for determining such data as described herein.

The means (e.g., probability mass estimation unit(s) 812) can be configured to estimate a probability mass for each of a plurality of locations in the environment at the one or more future times. A probability mass estimation unit is one example of a means for estimating a probability mass as described herein.

The means (e.g., data handling unit(s) 814) can be configured to provide data indicative of one or more motion predictions associated with one or more objects and data indicative of the probability of future occupancy of a plurality of locations to a motion planning system of an autonomous vehicle. A data handling unit is one example of a means for provide data indicative of one or more motion predictions as described herein.

The means (e.g., model training unit(s) 816) can be configured to train one or more machine-learned models as described herein. For example, the means can be configured to train one or more machine-learned models to generate data indicative of a probability of future occupancy of a plurality of locations. A model training unit is one example of a means for training a machine-learned model as described herein.

The means (e.g., vehicle controlling unit(s) 818) can be configured to generate one or more vehicle control signals for one or more vehicle controls (e.g., actuators or other devices that control gas flow, steering, braking, etc.) for the autonomous vehicle based at least in part on a motion plan. A vehicle controlling unit is one example of a means for generating control signals for an autonomous vehicle as described herein.

FIG. 10 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform various operations as part of motion planning for an autonomous vehicle. For example, computing system 1002 can receive sensor data map data associated with an environment external to an autonomous vehicle, and process the sensor data and the map data to generate a target trajectory for the autonomous vehicle, as part of autonomous vehicle operations. In some implementations, the computing system 1002 can be included in an autonomous vehicle. For example, the computing system 1002 can be on-board the autonomous vehicle. In some embodiments, computing system 1002 can be used to implement vehicle computing system 110. In other implementations, the computing system 1002 is not located on-board the autonomous vehicle. For example, the computing system 1002 can operate offline to obtain sensor data and perform target trajectory generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, map data, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating motion plans including target trajectories for an autonomous vehicle, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to generate uncertainty data for object detections, predictions, and motion plan generation based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 110.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models, sensor data, and map data as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, generating motion plans including target trajectories for an autonomous vehicle, and controlling an autonomous vehicle based on the target trajectories.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate motion plans including target trajectories in response to sensor data and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 1060 can train a machine-learned model 1010 and/or 1040 configured to generate motion plans including target trajectories as well as intermediate representations associated with one or more of an object detection or an object prediction. In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of motion planning for autonomous driving, comprising:
    inputting sensor data to a machine-learned system comprising one or more machine-learned models configured for object prediction in association with an environment external to an autonomous vehicle;
    obtaining as an output of the one or more machine-learned models, data indicative of one or more motion predictions associated with one or more objects detected by the machine-learned system;
    obtaining data indicative of at least one probability distribution having a plurality of probability modes respectively corresponding to a possible event
    defining a level set of the at least one probability distribution based at least in part on a predefined percentage of a probability mass, wherein the level set is configured to associate a larger confidence interval with a higher probability mode and a lower confidence interval with a lower probability mode;
    estimating the probability mass for a plurality of locations in the environment at the one or more future times;
    converting a shape of the one or more objects detected by the machine-learned system into a probability of occupancy by convolving an occupied area of the one or more objects with a continuous uncertainty associated with the one or more objects;
    determining data indicative of a probability of future occupancy of the plurality of locations in the environment at the one or more future times based at least in part on the data indicative of the one or more motion predictions associated with the one or more objects and the probability of occupancy of the one or more objects; and
    providing the data indicative of the one or more motion predictions associated with the one or more objects and the data indicative of the probability of future occupancy of the plurality of locations to a motion planning system of the autonomous vehicle.

2. The computer-implemented method of claim 1, wherein converting the shape of the one or more objects detected by the machine-learned system into the probability of occupancy, comprises:
    convolving the occupied area with a probabilistic kernel indicative of the continuous uncertainty associated with the one or more objects.

3. The computer-implemented method of claim 2, wherein converting the shape of one or more objects into the probability of occupancy, comprises:
    obtaining data indicative of the continuous uncertainty associated with the one or more objects; and
    convolving the continuous uncertainty associated with the one or more objects with the shape of the one or more objects to generate a probabilistic uncertainty for at least one trajectory of the one or more objects.

4. The computer-implemented method of claim 3, wherein:
    the shape of the one or more objects incorporates uncertainty by using a probability distribution to describe an occupancy of the one or more objects.

5. The computer-implemented method of claim 1, wherein estimating the probability mass for the plurality of locations in the environment comprises:
    determining an estimated probability of occupancy associated with the one or more objects;
    determining an occupancy area associated with the one or more objects; and integrating the estimated probability of occupancy over the occupancy area associated with the one or more objects.

6. The computer-implemented method of claim 1, wherein:
the probability mass is a total probability mass;
the at least one probability distribution is associated with one or more trajectory probabilities associated with the one or more objects; and
the method further comprises modulating the larger confidence interval and the lower confidence interval such that a sum of a first probability mass associated with the larger confidence interval and a second probability mass associated with the lower confidence interval sum to the predefined percentage of the total probability mass.

7. The computer-implemented method of claim 1, wherein determining data indicative of the probability of future occupancy comprises:
determining a combined probability of a plurality of objects occupying a first location at a first time.

8. The computer-implemented method of claim 1, wherein determining data indicative of the probability of future occupancy comprises:
determining data indicative of at least one uncertainty associated with one or more motion predictions associated with a first object;
determining data indicative of at least one uncertainty associated with one or more motion predictions associated with a second object; and
generating data indicative of the probability of future occupancy of a first location at a first time based at least in part on the data indicative of the at least one uncertainty associated with the one or more motion predictions associated with the first object and the data indicative of the at least one uncertainty associated with the one or more motion predictions associated with the second object.

9. The computer-implemented method of claim 1, wherein determining data indicative of the probability of future occupancy comprises:
obtaining data indicative of an uncertainty associated with an object detection;
obtaining data indicative of an uncertainty associated with an object prediction; and
generating data indicative of the probability of future occupancy of a first location at a first time based at least in part on the data indicative of the uncertainty associated with the object detection and the data indicative of the uncertainty associated with the object prediction.

10. The computer-implemented method of claim 1, wherein:
the machine-learned system comprises one or more machine-learned models configured to generate data indicative of the probability of future occupancy of the plurality of locations;
inputting sensor data to the machine-learned system comprises inputting sensor data to the one or more machine-learned models configured to generate the data indicative of the probability of future occupancy of the plurality of locations; and
determining data indicative of the probability of future occupancy of the plurality of locations comprises obtaining, from the one or more machine-learned models configured to generate the data indicative of the probability of future occupancy of the plurality of locations, the data indicative of the probability of future occupancy of the plurality of locations.

11. The computer-implemented method of claim 1, further comprising:
generating, as an output of the motion planning system, a motion plan based at least in part on the data indicative of the probability of future occupancy of the plurality of locations.

12. The computer-implemented method of claim 11, wherein generating the motion plan comprises:
inputting the data indicative of the probability of future occupancy of the plurality of future locations to one or more machine-learned models of the machine-learned system configured to generate motion plans for the autonomous vehicle; and
obtaining, as an output of the one or more machine-learned models of the machine-learned system configured to generate motion plans for the autonomous vehicle, the motion plan based at least in part on the data indicative of the probability of future occupancy of the plurality of locations.

13. The computer-implemented method of claim 11, further comprising:
generating one or more vehicle control signals for the autonomous vehicle based at least in part on the motion plan.

14. A computing system, comprising:
one or more processors; and
one or more non-transitory computer-readable media that store instructions for execution by the one or more processors to cause the computing system to perform operations, the operations comprising:
inputting sensor data to a machine-learned system comprising one or more machine-learned models configured for object prediction in association with an environment external to an autonomous vehicle;
obtaining, as an output of the one or more machine-learned models, data indicative of one or more motion predictions associated with one or more objects detected by the machine-learned system;
obtaining data indicative of at least one probability distribution having a plurality of probability modes respectively corresponding to a possible event
defining a level set of the at least one probability distribution based at least in part on a predefined percentage of a probability mass, wherein the level set is configured to associate a larger confidence interval with a higher probability mode and a lower confidence interval with a lower probability mode;
estimating the probability mass for a plurality of locations in the environment at the one or more future times;
converting a shape of the one or more objects detected by the machine-learned system into a probability of occupancy by convolving an occupied area of the one or more objects with a continuous uncertainty associated with the one or more objects;
determining data indicative of a probability of future occupancy of the plurality of locations in the environment at the one or more future times based at least in part on the data indicative of the one or more motion predictions associated with the one or more objects and the probability of occupancy of the one or more objects; and
providing the data indicative of the one or more motion predictions and the data indicative of the probability of future occupancy of the plurality of locations to a motion planning system of the autonomous vehicle.

15. The computing system of claim 14, wherein the operations further comprise:
   determining an estimated probability of occupancy associated with the one or more objects;
   determining an occupancy area associated with the one or more objects;
   integrating the estimated probability of occupancy over the occupancy area associated with one or more objects; and
   estimating a probability mass for the respective plurality of locations in the environment at the one or more future times based on integrating the estimated probability of occupancy over the occupancy area.

16. An autonomous vehicle, comprising:
   one or more sensors configured to generate sensor data in association with an environment external to the autonomous vehicle;
   one or more processors; and
   one or more non-transitory computer-readable media that store instructions for execution by the one or more processors to cause the one or more processors to perform operations, the operations comprising:
      inputting sensor data from the one or more sensors to a machine-learned system comprising one or more machine-learned models configured for object prediction;
      obtaining, as an output of the one or more machine-learned models, data indicative of one or more motion predictions associated with one or more objects detected by the machine-learned system;
      obtaining data indicative of at least one probability distribution having a plurality of probability modes respectively corresponding to a possible event defining a level set of the at least one probability distribution based at least in part on a predefined percentage of a probability mass, wherein the level set is configured to associate a larger confidence interval with a higher probability mode and a lower confidence interval with a lower probability mode;
      estimating the probability mass for a plurality of locations in the environment at the one or more future times;
      converting a shape of the one or more objects detected by the machine-learned system into a probability of occupancy by convolving an occupied area of the one or more objects with a continuous uncertainty associated with the one or more objects;
      determining data indicative of a probability of future occupancy of the plurality of locations in the environment at the one or more future times based at least in part on the data indicative of the one or more motion predictions associated with the one or more objects and the probability of occupancy of the one or more objects; and
      providing the data indicative of the one or more motion predictions and the data indicative of the probability of future occupancy of the plurality of locations to a motion planning system of the autonomous vehicle.

17. The autonomous vehicle of claim 16, wherein the operations further comprise:
   defining a level set of the at least one probability distribution based at least in part on a predefined percentage of a total probability mass; and
   estimating the total probability mass for the respective plurality of locations in the environment at the one or more future times based on defining the level set of the at least one probability distribution.

* * * * *